US012696319B2

(12) United States Patent
Jiang

(10) Patent No.: US 12,696,319 B2
(45) Date of Patent: Jul. 28, 2026

(54) COMMUNICATION METHOD AND APPARATUS, AND STORAGE MEDIUM

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 598 days.

(21) Appl. No.: 17/909,965

(22) PCT Filed: Mar. 9, 2020

(86) PCT No.: PCT/CN2020/078467
§ 371 (c)(1),
(2) Date: Sep. 7, 2022

(87) PCT Pub. No.: WO2021/179136
PCT Pub. Date: Sep. 16, 2021

(65) Prior Publication Data
US 2023/0106898 A1      Apr. 6, 2023

(51) Int. Cl.
*H04W 74/0833*          (2024.01)

(52) U.S. Cl.
CPC .............................. *H04W 74/0833* (2013.01)

(58) Field of Classification Search
None
See application file for complete search history.

(56) References Cited

U.S. PATENT DOCUMENTS

| | | | |
|---|---|---|---|
| 10,182,459 B2 | 1/2019 | Murray et al. | |
| 2013/0343307 A1 | 12/2013 | Desai et al. | |
| 2017/0367120 A1* | 12/2017 | Murray | H04B 7/2603 |
| 2018/0132282 A1 | 5/2018 | Ly et al. | |
| 2018/0192401 A1* | 7/2018 | Au | H04W 52/0229 |
| 2018/0376511 A1 | 12/2018 | Tsai et al. | |

(Continued)

FOREIGN PATENT DOCUMENTS

| | | |
|---|---|---|
| CN | 106954278 A | 7/2017 |
| CN | 109041228 A | 12/2018 |

(Continued)

OTHER PUBLICATIONS

International Search Report issued in Application No. PCT/CN2020/078467 dated Dec. 21, 2020,(6p).
(Continued)

*Primary Examiner* — Un C Cho
*Assistant Examiner* — Alan L Lindenbaum
(74) *Attorney, Agent, or Firm* — Arch & Lake LLP

(57) ABSTRACT

A communication method includes: determining, by a network device, for first user equipment (UE), a first random access channel (RACH) configuration, the first RACH configuration being different from a second RACH configuration, the second RACH configuration is configured for second UE; determining, for the first RACH configuration, first identifier derivation information associated with a random access identifier, the first identifier derivation information being different from second identifier derivation information for the second RACH configuration; and determining, based on the first identifier derivation information, the random access identifier.

18 Claims, 11 Drawing Sheets

Determine, for first user equipment (UE), a first random access channel (RACH) configuration, the first RACH configuration being different from a second RACH configuration
S11

Determine, for the first RACH configuration, first identifier derivation information associated with a random access identifier, the first identifier derivation information being different from second identifier derivation information for the second RACH configuration
S12

Determine, based on the first identifier derivation information, the random access identifier
S13

(56)        References Cited

U.S. PATENT DOCUMENTS

| | | | |
|---|---|---|---|
| 2019/0029036 A1 | 1/2019 | John Wilson et al. | |
| 2019/0082471 A1* | 3/2019 | Tsai | H04L 5/0048 |
| 2019/0110314 A1 | 4/2019 | Abedini et al. | |
| 2019/0110320 A1 | 4/2019 | Lee et al. | |
| 2019/0313437 A1 | 10/2019 | Jung et al. | |
| 2019/0327767 A1 | 10/2019 | Islam et al. | |
| 2020/0229157 A1* | 7/2020 | Rastegardoost | H04W 74/0833 |
| 2020/0229241 A1* | 7/2020 | Jeon | H04W 74/0833 |
| 2022/0191934 A1* | 6/2022 | Miao | H04W 74/002 |

FOREIGN PATENT DOCUMENTS

| | | | |
|---|---|---|---|
| CN | 109644494 A1 | 4/2019 | |
| CN | 109803455 A1 | 5/2019 | |
| CN | 110063083 A1 | 7/2019 | |
| CN | 110536441 A | 12/2019 | |
| CN | 110771248 A | 2/2020 | |
| WO | 2017173883 A1 | 10/2017 | |
| WO | 2018054099 A1 | 3/2018 | |
| WO | 2019196066 A1 | 10/2019 | |

OTHER PUBLICATIONS

Spreadtrum Communications, "Considerations on the random access procedure on 2-step" 3GPP TSG RAN WG1 Meeting #96bis, R1-1904779, Xi'an, China, Apr. 2019, (5p).

Ericsson, "Initialization of M-PDCCH" 3GPP TSG RAN WG1 Meeting #82bis, R1-155028, Malmo Sweden, Oct. 2015, (3p).

Spreadtrum communications, "Considerations on the random access procedure on 2-step Rach", 3GPP TSG RAN WG1 Meeting #96Bis, R1-1904779, Xi'an, China, Apr. 8-Apr. 15, 2019,(5p).

* cited by examiner

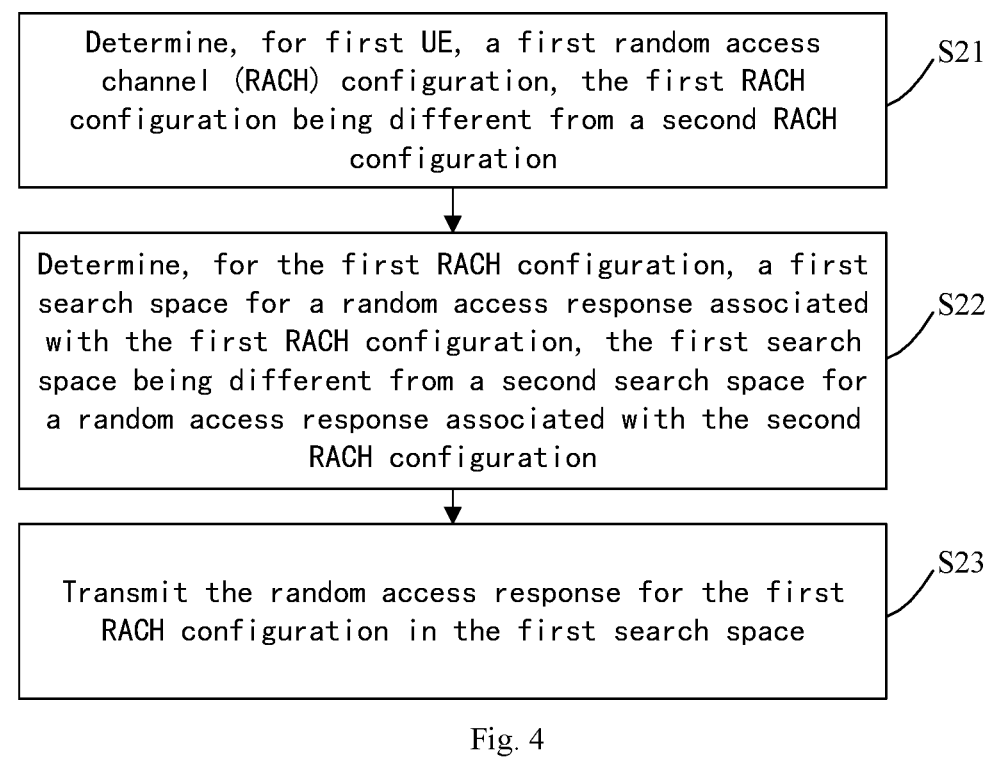

Determine, for first UE, a first random access channel (RACH) configuration, the first RACH configuration being different from a second RACH configuration    S21

Determine, for the first RACH configuration, a first search space for a random access response associated with the first RACH configuration, the first search space being different from a second search space for a random access response associated with the second RACH configuration    S22

Transmit the random access response for the first RACH configuration in the first search space    S23

Fig. 4

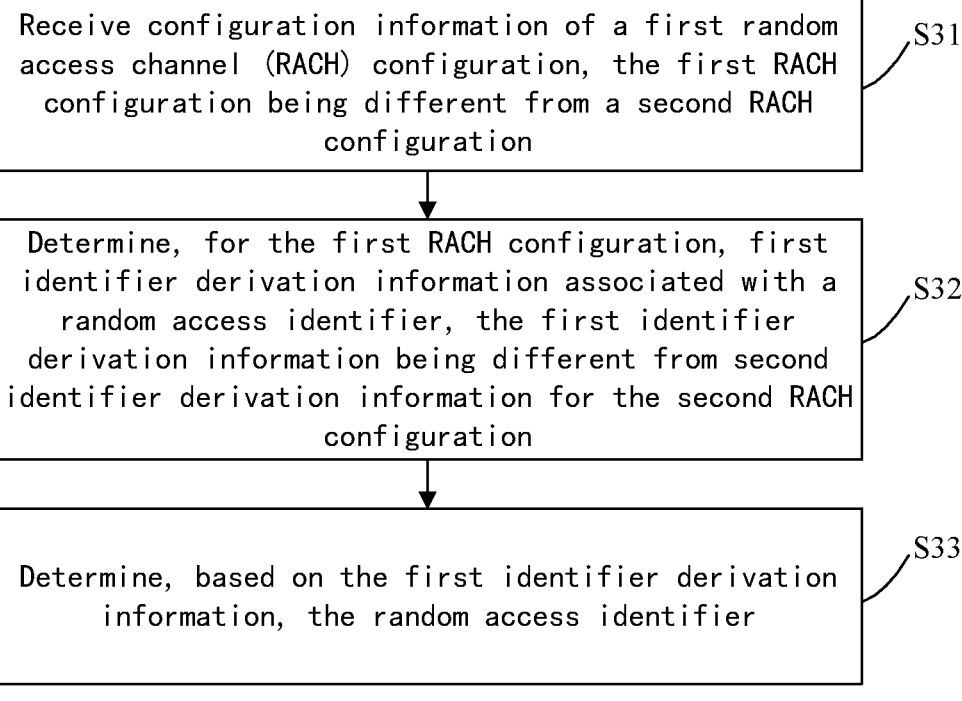

Receive configuration information of a first random access channel (RACH) configuration, the first RACH configuration being different from a second RACH configuration                                    S31

Determine, for the first RACH configuration, first identifier derivation information associated with a random access identifier, the first identifier derivation information being different from second identifier derivation information for the second RACH configuration                                    S32

Determine, based on the first identifier derivation information, the random access identifier                                    S33

Fig. 5

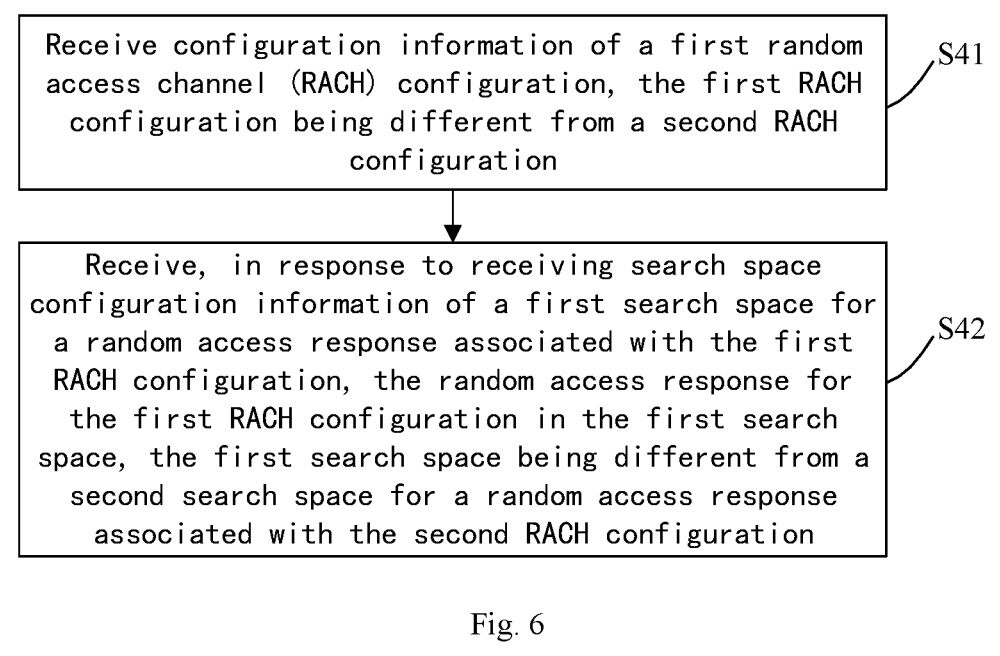

Receive configuration information of a first random access channel (RACH) configuration, the first RACH configuration being different from a second RACH configuration    S41

Receive, in response to receiving search space configuration information of a first search space for a random access response associated with the first RACH configuration, the random access response for the first RACH configuration in the first search space, the first search space being different from a second search space for a random access response associated with the second RACH configuration    S42

Fig. 6

COMMUNICATION METHOD AND APPARATUS, AND STORAGE MEDIUM

CROSS REFERENCE TO RELATED APPLICATION

The present application is a U.S. National Stage of International Application No. PCT/CN2020/078467, filed on Mar. 9, 2020, the entire content of which is incorporated herein by reference for all purposes.

BACKGROUND

In the related art, the network has only one common random access configuration and determines the random access-radio network temporary identifier (RA-RNTI) according to the time domain position and the frequency domain position of the random access channel occasion (RO). After the user equipment (UE) transmits the random access preamble, the network identifies the responding random access preamble from the random access response through the RA-RNTI according to the transmission position of the random access preamble. However, the plurality of physical random access channel (PRACH) configurations will result in a plurality of frequency domain positions, and consequently, the UE cannot identify the random access responses of different frequency domains.

SUMMARY

The disclosure provides a communication method and apparatus, and a storage medium.

In a first aspect, an example of the disclosure provides a communication method, performed by network device and including:

determining, for first user equipment (UE), a first random access channel (RACH) configuration, the first RACH configuration being different from a second RACH configuration;

determining, for the first RACH configuration, first identifier derivation information associated with a random access identifier, the first identifier derivation information being different from second identifier derivation information for the second RACH configuration; and determining, based on the first identifier derivation information, the random access identifier.

In a second aspect, an example of the disclosure provides a communication method, performed by first user equipment (UE) and including:

receiving configuration information of a first random access channel (RACH) configuration, the first RACH configuration being different from a second RACH configuration;

determining, for the first RACH configuration, first identifier derivation information associated with a random access identifier, the first identifier derivation information being different from second identifier derivation information for the second RACH configuration; and determining, based on the first identifier derivation information, the random access identifier.

In a third aspect, an example of the disclosure provides a communication apparatus, including:

a processor; and a memory configured for storing an executable instruction executable by the processor;

where the processor is configured for implementing the communication method according to any of the foregoing technical solutions performed by network device when executing the executable instruction.

In a fourth aspect, an example of the disclosure provides a communication apparatus, including:

a processor; and a memory configured for storing an executable instruction executable by the processor; where the processor is configured for implementing the communication method according to any of the foregoing technical solutions performed by first UE when executing the executable instruction.

It is to be understood that the general description above and the following detailed description are exemplary and explanatory only and may not limit the disclosure.

BRIEF DESCRIPTION OF THE DRAWINGS

The accompanying drawings herein, which are incorporated into and constitute a part of the description, illustrate examples consistent with the disclosure and, together with the description, is used to explain the principles of the disclosure.

FIG. 4 is a second flow chart of a communication method shown according to an example;

FIG. 5 is a third flow chart of a communication method shown according to an example;

FIG. 6 is a fourth flow chart of a communication method shown according to an example;

DETAILED DESCRIPTION

The examples will be described in detail herein and shown in the accompanying drawings. When the following descriptions relate to the accompanying drawings, unless otherwise indicated, the same numerals in different accompanying drawings denote the same or similar elements. The implementations described in the following examples do not denote all implementations consistent with the examples of the disclosure. On the contrary, they are merely examples of an apparatus and a method consistent with some aspects of the examples of the disclosure as recited in the appended claims.

The terms used in the examples of the disclosure are merely to describe the specific examples, instead of limiting the examples of the disclosure. The singular forms such as "a", "an", and "this" used in the examples of the disclosure and the appended claims are also intended to include the plural forms, unless otherwise clearly stated in the context. It is also to be understood that the term "and/or" used herein refers to and encompasses any of one or more of associated items listed or all possible combinations.

It is to be understood that although the terms first, second, third, etc. may be employed in the examples of the disclosure, to describe various information, these information should not be limited to these terms. These terms are merely used for distinguishing between the same type of information from one another. For example, first information may also be referred to as second information, and similarly, second information may also be referred to as first information, without departing from the scope of the examples of the disclosure. Depending on the context, the word "if" and "in case" as used herein may be interpreted as "at the time of", "when", or "in response to determining".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

The disclosure relates to a communication technology, and in particular to a communication method and apparatus, and a storage medium.

Figure 1:
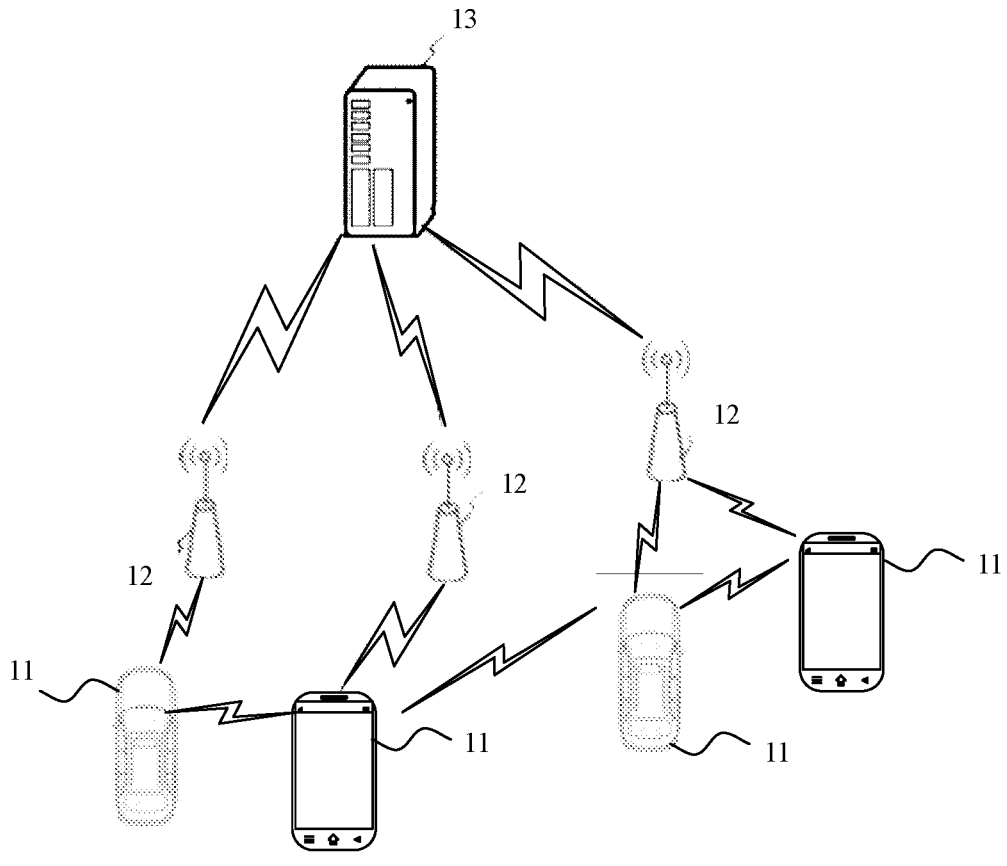
FIG. 1 is a structural schematic diagram of a radio communication system shown according to an example.

FIG. 1 shows a structural schematic diagram of a radio communication system provided in an example of the disclosure. As shown in FIG. 1, the radio communication system is based on a cellular mobile communication, and may include: several terminals 11 and several base stations 12.

The terminals 11 may be devices providing voice and/or data connectivity for a user. The terminals 11 may communicate with one or more core networks via a radio access network (RAN). The terminals 11 may be Internet of Things terminals, such as sensor devices, mobile phones (or "cellular" phones), and computers with Internet of Things terminals, for example, stationary, portable, pocket, handheld, intra-computer, or vehicle-mounted apparatuses. For example, a station (STA), a subscriber unit, a subscriber station, a mobile station, a mobile, a remote station, an access point, a remote terminal, an access terminal, a user terminal, a user agent, a user device, or user equipment (UE). Alternatively, the terminals 11 may also be unmanned aerial vehicles. Alternatively, the terminals 11 may also be vehicle-mounted devices, for example, electronic control units having a radio communication function, or radio communication devices externally connected to the electronic control units. Alternatively, the terminals 11 may also be roadside devices, for example, street lamps, signal lamps, etc. having a radio communication function.

The base stations 12 may be network-side devices in the radio communication system. The radio communication system may be a 4th generation mobile communication (4G) system, which is also called a long term evolution (LTE) system. Alternatively, the radio communication system may also be a 5G system, which is also called a new radio (NR)

system or a 5G NR system. Alternatively, the radio communication system may also be a next generation system following the 5G system. An access network of the 5G system may be called a new generation-radio access network (NG-RAN), or a machine-type communication (MTC) system.

Each of the base stations 12 may be an evolved node B (eNB) employed in the 4G system. Alternatively, each of the base stations 12 may be a next generation node B (gNB) employing a centralized-distributed architecture in the 5G system. When employing the centralized-distributed architecture, each of the base stations 12 generally includes a central unit (CU) and at least two distributed units (DUs). The central unit is provided with a protocol stack of a packet data convergence protocol (PDCP) layer, a radio link control (RLC) layer, and a media access control (MAC) layer. Each of the distributed units is provided with a protocol stack of a physical (PHY) layer. Specific implementations of the base stations 12 are not limited in the examples of the disclosure.

The base stations 12 are in radio connection with the terminals 11 through a wireless radio. In different implementations, the wireless radio is based on a standard of the 4th generation mobile communication (4G), or a standard of the 5th generation mobile communication (5G), and is a new radio, for example. Alternatively, the wireless radio may also be based on a standard of a next generation mobile communication following 5G.

In some examples, an end to end (E2E) connection may be established between the terminals 11. For example, scenarios such as vehicle to vehicle (V2V) communication, vehicle to infrastructure (V2I) communication, and vehicle to pedestrian (V2P) communication in vehicle to everything (V2X) communication are provided.

In some examples, the radio communication system described above may further contain a network management device 13.

Several base stations 12 are individually connected with the network management device 13. The network management device 13 may be a core network device in the radio communication system. For example, the network management device 13 may be a mobility management entity (MME) in an evolved packet core (EPC). Alternatively, the network management device may also be another core network device, such as a serving gateway (SGW), a public data network gateway (PGW), a policy and charging rules function (PCRF), a home subscriber server (HSS), etc. An implementation form of the network management device 13 is not limited in the examples of the disclosure.

Figure 2:
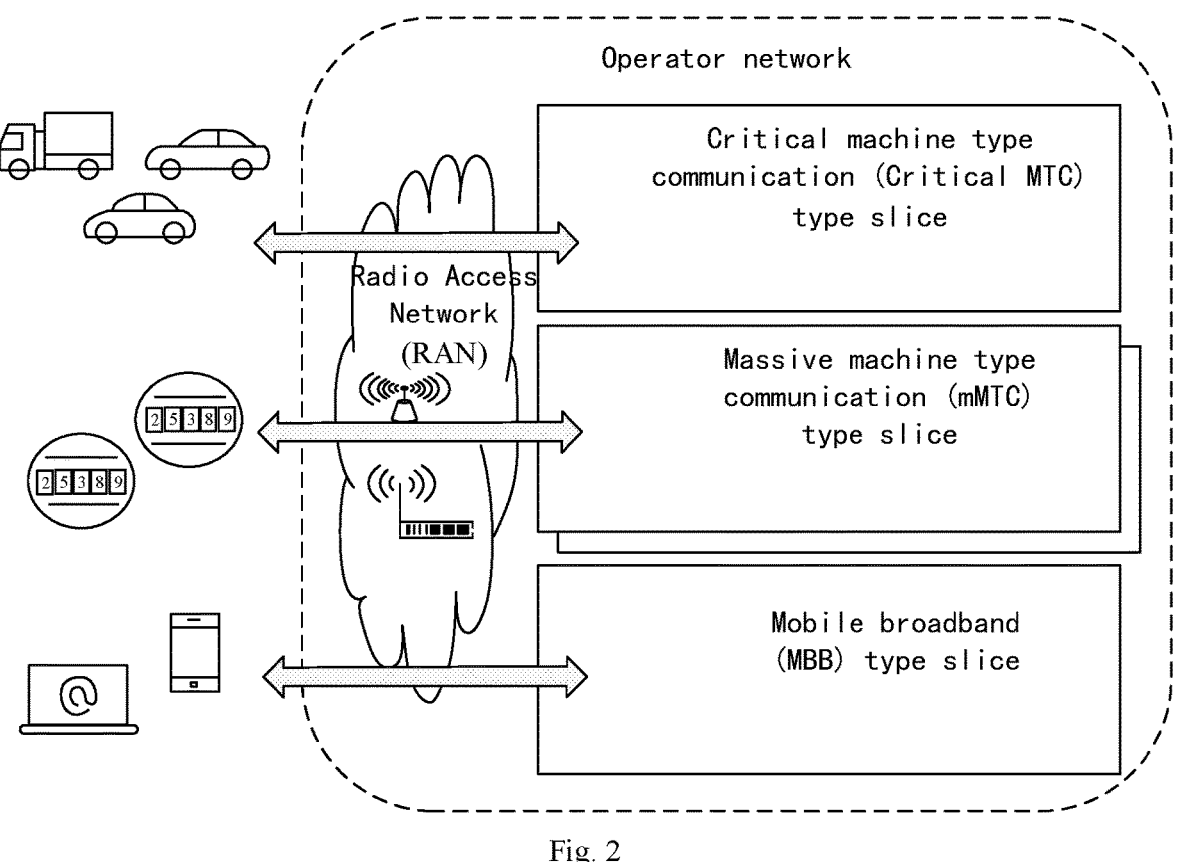
FIG. 2 is a schematic diagram showing different services being transmitted in different slices according to an example.

5G introduces a network slicing technology, which allows networks (the core network and the access network) to be divided into a plurality of slices, and different services are transmitted in different slices without interfering with each other. As shown in FIG. 2, three different types of services, that is, a critical machine type communication (MTC) type service, a massive machine type communication (mMTC) type service, and a mobile broadband (eMBB) type service are divided to three slices, of which charging policies, security policies, quality of service (QoS) policies, etc. may be different from one another. Large-scale service congestion in one slice will not affect normal running of services in other slices.

During initial access, the UE will carry network slice selection assistance information (NSSAI) in radio resource control (RRC) and a non-access stratum (NAS) message, where NSSAI is used for indicating slice/service type (s), and may also contain some other information, to assist in selecting slices of the radio access network (RAN)/core network (CN). The NSSAI information of the UE may have been configured in the UE (each public land mobile network (PLMN) is configured separately, which is called configured NSSAI (may be changed over the air)), or may be default NSSAI (may be written into the UE when delivery), which may be provided for the network when the UE does not have the configured NSSAI.

One piece of UE may be configured with a plurality of CN slices. For different slices, the network may consider configuring different random access resources for different slices, so that random accesses among the slices do not interfere with one another, and random access congestion of one slice service is prevented from causing congestion of another slice service.

The random access resources of different slices may be isolated from one another by allocating different random access preambles, different time domain and frequency domain resources, which may be combined with one another.

When a frequency domain random access resource is used as a resource isolation manner, the network will specify a frequency domain start position of the random access resource and the number of random access channel occasions (ROs) of frequency domain multiplexing. A plurality of ROs multiplexed in the frequency domain are numbered through f_id as 0, 1, 2 . . . . Similarly, if different time domain resources are used as a resource isolation manner, the network may specify a time domain position of the random access resource.

In the related art, the network has only one common random access configuration, and determines, according to a time domain position and a frequency domain position of an RACH occasion, a random access-radio network temporary identifier (RA-RNTI) of a random access. For example, a formula (1) to determine the RA-RNTI is as follows:

$$RA\text{-}RNTI = 1 + s\_id + 14 \times t\_id + 14 \times 80 \times f\_id + 14 \times 80 \times 8 \times ul\_carrier\_id. \quad (1)$$

s_id denotes a start orthogonal frequency division multiplexing (OFDM) symbol for the UE to transmit the random access preamble, t_id denotes a start slot for the UE to transmit the random access preamble, f_id denotes an index value of a frequency domain occasion to transmit the random access preamble, and ul_carrier_id denotes whether to transmit on a supplementary uplink (SUL) carrier or a non-SUL carrier.

After the UE transmits the random access preamble, the network identifies, according to a transmission position of the random access preamble, the responding random access preamble from the random access response through the RA-RNTI. As described above, a previous NR has only one random access configuration, and according to the number of ROs multiplexed at a frequency domain position corresponding to the configuration, the frequency domains correspond, one-to-one, to f_id numbers 0, 1, 2 . . . from low to high. However, a plurality of physical random access channel (PRACH) configurations will result in a plurality of frequency domain positions. The f_id numbers will result in that a plurality of multiplexing ROs are each numbered from 0 at different frequency domain positions, which leads to repetition of a calculated RA-RNTI. Thus, the network may not identify the random access preambles transmitted at different frequency domain positions.

Based on the radio communication system described above, various examples of the method of the disclosure are provided, to distinguish between a random access and a random access response in the presence of a plurality of PRACH configurations.

Figure 3:
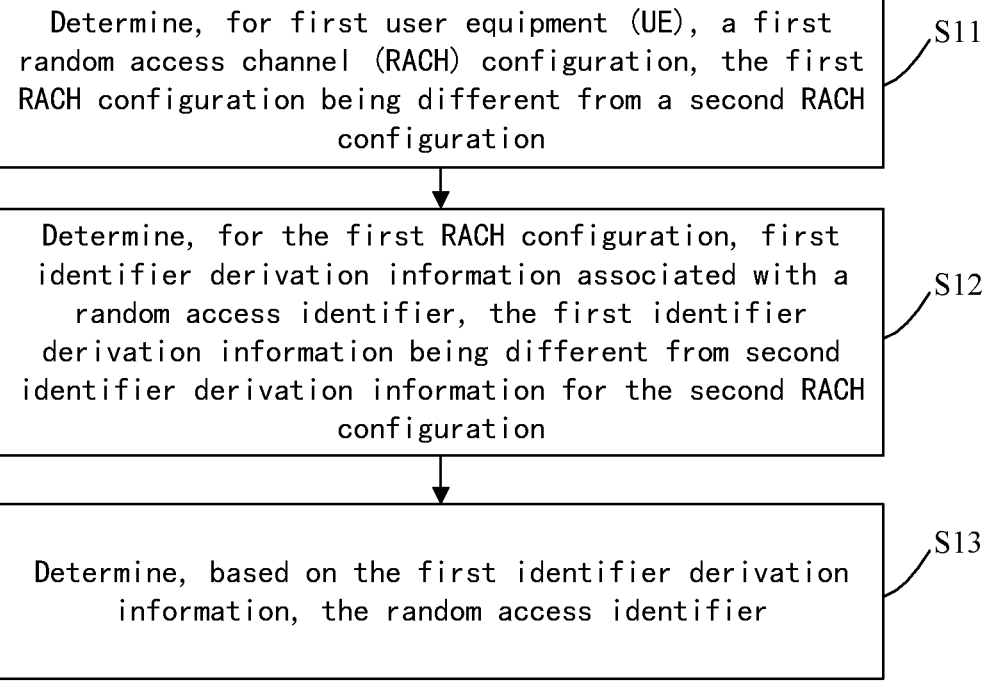
FIG. 3 is a first flow chart of a communication method shown according to an example.
Figure 7:
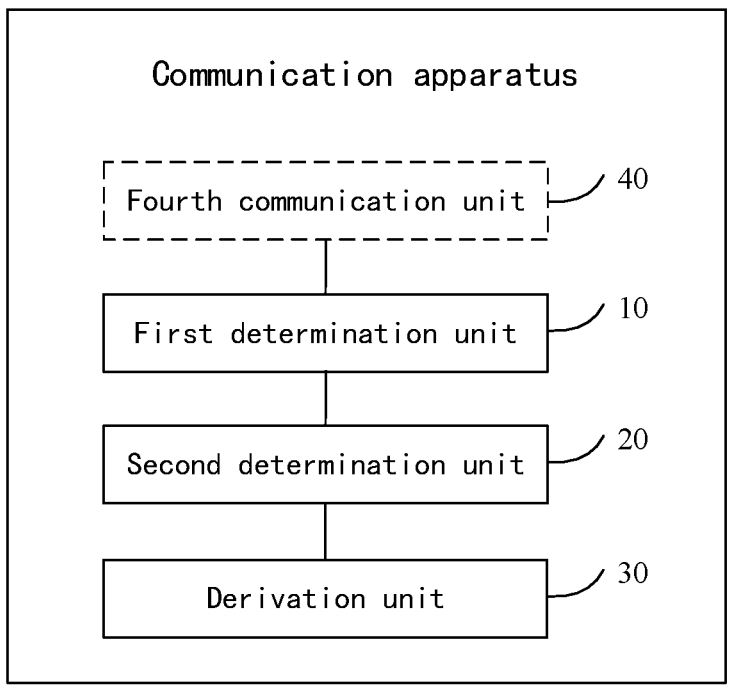
FIG. 7 is a first block diagram of a communication apparatus shown according to an example.

FIG. 3 is a first flow chart of a communication method shown according to an example. The communication method is used in a network device such as a base station. As shown in FIG. 3, the communication method includes:

Step S11, determine, for first user equipment (UE), a first random access channel (RACH) configuration, the first RACH configuration being different from a second RACH configuration.

Step S12, determine, for the first RACH configuration, first identifier derivation information associated with a random access identifier, the first identifier derivation information being different from second identifier derivation information for the second RACH configuration.

Step S13, determine, based on the first identifier derivation information, the random access identifier.

In an example of the disclosure, the random access identifier may include a random access-radio network temporary identifier (RA-RNTI).

In some implementations, the first identifier derivation information indicates start offset of an index value of a frequency domain occasion for the first UE to transmit a random access preamble, the random access preamble corresponding to the random access identifier.

In some other implementations, the first identifier derivation information indicates an index value of a frequency domain occasion for the first UE to transmit a random access preamble, the random access preamble corresponding to the random access identifier.

In this way, different random accesses transmitted by the same UE may be distinguished from one another by determining, for different RACH configurations, different identifier derivation information associated with random access identifiers.

In some implementations, in the step S13, The network device may determine the random access identifier according to the first identifier derivation information. For example, the network device may determine the index value of the frequency domain occasion for the first UE to transmit a random access preamble indicated by the first identifier derivation information, and determine the RA-RNTI based on the formula (1).

In some examples, the first RACH configuration is configured for a first network slice, and the second RACH configuration is configured for a second network slice, the first network slice being different from the second network slice.

In this way, when the network device configures the first network slice and the second network slice for the first UE, the first UE may receive configuration information of the first RACH configuration and configuration information of the second RACH configuration.

In some examples, the first RACH configuration is configured for the first UE, and the second RACH configuration is configured for second UE.

That is to say, the second RACH configuration is not necessarily configured for the first UE by the network device. When the second RACH configuration is not configured for the first UE, the first UE is not required to receive RACH configuration information of other UE, that is, not required to receive the configuration information of the second RACH configuration.

In some examples, the method may include: determine a plurality of RACH configurations, the plurality of RACH configurations including the first RACH configuration and the second RACH configuration. In some examples, step S12 includes:

Step S12a: determine the first identifier derivation information associated with the random access identifier according to an order, among the plurality of RACH configurations, of the first RACH configuration and the number of random access channel occasions (ROs) of frequency division multiplexing supported by the first RACH configuration.

In some implementations, the network device transmits, in a form of a configuration list, configuration information including the plurality of RACH configurations to the first UE, the configuration list indicating an order and the number of ROs of frequency division multiplexing supported of each of the RACH configurations. In this way, the first UE may determine the first identifier derivation information, associated with the random access identifier, of the first RACH configuration conveniently.

For example, the network device transmits configuration information including a plurality of RACH configurations to the first UE, the plurality of RACH configurations including a first RACH configuration and a second RACH configuration, the second RACH configuration being ranked first or last, and the first RACH configuration being adjacent to the second RACH configuration. Thus, when identifier derivation information indicates start offset of an index value of a frequency domain occasion for the first UE to transmit a random access preamble, it is determined that identifier derivation information corresponding to the second RACH configuration is 0; and if the number of ROs of frequency division multiplexing supported by the second RACH configuration is N1, it is determined that first identifier derivation information corresponding to the first RACH configuration is N1–1. When the identifier derivation information indicates an index value of a frequency domain occasion for the first UE to transmit a random access preamble, and if the number of ROs of frequency division multiplexing supported by the second RACH configuration is N1, it is determined that identifier derivation information corresponding to the second RACH configuration is 0 to N1–1; and if the number of ROs of frequency division multiplexing supported by the first RACH configuration is N2, it is determined that first identifier derivation information corresponding to the first RACH configuration is N1 to N1+N2–1.

In some examples, the first identifier derivation information indicates start offset of an index value of a frequency domain occasion for the first UE to transmit a random access preamble, the random access preamble corresponding to the random access identifier. The plurality of RACH configurations further include a common RACH configuration. When the common RACH configuration is ranked first or last among the plurality of RACH configurations, the method may include: determine identifier derivation information corresponding to the common RACH configuration as 0.

In this way, identifier derivation information of each of the plurality of RACH configurations may be obtained.

For example, the network device transmits configuration information including a plurality of RACH configurations to the first UE, the plurality of RACH configurations including a common RACH configuration and a first RACH configuration, the common RACH configuration being ranked first or last, and the first RACH configuration being adjacent to the common RACH configuration. Thus, it is determined that identifier derivation information corresponding to the common RACH configuration is 0; if the number of ROs of frequency division multiplexing supported by the common RACH configuration is N1, it is determined that identifier derivation information corresponding to the first RACH configuration is N1–1; and if the plurality of RACH configurations further include a second RACH configuration, the second RACH configuration is also adjacent to the first RACH configuration, and the number of ROs of frequency division multiplexing supported by the first RACH configuration is N2, it is determined that identifier derivation information corresponding to the second RACH configuration is N1+N2, and so on, so that the identifier derivation information of each of the plurality of RACH configurations may be obtained.

In some examples, the step of determining first identifier derivation information associated with a random access identifier includes:

determine a value of the first identifier derivation information as start offset of a previous neighboring RACH configuration immediately before the first RACH configuration in the order of the plurality of RACH configurations plus the number of ROs supported by the previous neighboring RACH configuration. When the first RACH configuration is the first one in the order of the plurality of RACH configurations, the value of the first identifier derivation information is predetermined start offset.

For example, the network device transmits configuration information including a plurality of RACH configurations to the first UE, the plurality of RACH configurations including a first RACH configuration and a second RACH configuration, the first RACH configuration being adjacent to the second RACH configuration, and the second RACH configuration being ranked before the first RACH configuration. Thus, when identifier derivation information indicates start offset of an index value of a frequency domain occasion for the first UE to transmit a random access preamble, start offset of the second RACH configuration is determined first, and if the start offset of the second RACH configuration is a, and the number of ROs of frequency division multiplexing supported by the second RACH configuration is N1, it is determined that start offset corresponding to the first RACH configuration is a+N1. For example, when a=0 and N1=10, the start offset corresponding to the first RACH configuration is 0+10=10.

For example, when the network device transmits configuration information including a plurality of RACH configurations to the first UE, the plurality of RACH configurations including a first RACH configuration. When the first RACH configuration is the first one in the order of the plurality of RACH configurations, and if start offset predetermined by the network device is b, it is determined that start offset corresponding to the first RACH configuration is b. For example, when b=1, the start offset corresponding to the first RACH configuration is 1.

In an example, the step of determining first identifier derivation information associated with a random access identifier includes: determine a plurality of pieces of first identifier derivation information for the first RACH configuration sequentially and incrementally at a fixed step size from an index value of a last RO among a plurality of ROs of a previous neighboring RACH configuration immediately before the first RACH configuration in the order of the plurality of RACH configurations, where when the first RACH configuration is the first one in the order of the plurality of RACH configurations, the plurality of pieces of first identifier derivation information for the first RACH configuration are determined sequentially and incrementally at the fixed step size from a predetermined fixed value.

The step size herein is preset by the network, and step sizes of index values of adjacent ROs among the plurality of ROs included in each of the RACH configurations are the same. For example, the number of ROs of frequency division multiplexing supported by the first RACH configuration is N1, and step sizes between adjacent ones of N1 ROs of the first RACH configuration are the same, which is set as c. Similarly, the number of the ROs of frequency division multiplexing supported by the second RACH configuration is N2, and step sizes between adjacent ones of N2 ROs of the second RACH configuration are the same, which should also be c.

For example, the network device transmits configuration information including a plurality of RACH configurations to the first UE, the plurality of RACH configurations including a first RACH configuration and a second RACH configuration, the first RACH configuration being adjacent to the second RACH configuration, and the second RACH configuration being ranked before the first RACH configuration. Thus, when identifier derivation information indicates an index value of a frequency domain occasion for the first UE to transmit a random access preamble, start offset of the second RACH configuration is determined first, and if the start offset of the second RACH configuration is a, the number of ROs of frequency division multiplexing supported by the second RACH configuration is N1. If a fixed step size is 1, an index value of a last one among N1 ROs of the second RACH configuration is N1+a−1. Further, index values of first, second, and N2th ones among N2 ROs of the first RACH configuration are (N1+a−1)+1=N1+a, N1+a+1, and N1+a+N2−1, respectively. For example, when a=0, N1=5, and N2=4, index values of first, second, third, and fourth ones among four ROs of the first RACH configuration are 5, 6, 7, and 8, respectively.

For example, the network device transmits configuration information including a plurality of RACH configurations to the first UE, the plurality of RACH configurations including a first RACH configuration. When the first RACH configuration is the first one in the order of the plurality of RACH configurations, if a start index value predetermined by the network device is b, and a fixed step size is 1, it is determined that index values of first, second, and N2th ones among N2 ROs of the first RACH configuration are b, b+1, and b+N2−1, respectively. For example, when b=0 and N2=10, index values of 10 ROs corresponding to the first RACH configuration are 0, 1, 2, 3, 4, 5, 6, 7, 8, and 9, respectively. In some examples, the first identifier derivation information indicates an index value of a frequency domain occasion for the first UE to transmit a random access preamble, the random access preamble corresponding to the random access identifier. The plurality of RACH configurations further include a common RACH configuration. When the common RACH configuration is ranked first or last among the plurality of RACH configurations, the method may include: determine identifier derivation information corresponding to the common RACH configuration as 0 to N1−1, N1 being the number of ROs of frequency division multiplexing supported by the common RACH configuration.

In this way, identifier derivation information of each of the plurality of RACH configurations may be obtained.

For example, the network device transmits configuration information including a plurality of RACH configurations to the first UE, the plurality of RACH configurations including a common RACH configuration and a first RACH configuration, the common RACH configuration being ranked first or last, and the first RACH configuration being adjacent to the common RACH configuration. Thus, if the number of ROs of frequency division multiplexing supported by the common RACH configuration is N1, it is determined that identifier derivation information corresponding to the common RACH configuration is 0 to N1−1; if the number of ROs of frequency division multiplexing supported by the first RACH configuration is N2, it is determined that identifier derivation information corresponding to the first RACH configuration is N1 to N2+N1−1; and if the plurality of RACH configurations further include a second RACH configuration, the second RACH configuration is also adjacent to the first RACH configuration, and the number of ROs of frequency division multiplexing supported by the second RACH configuration is N3, it is determined that identifier derivation information corresponding to the second RACH configuration is N1+N2 to N2+N3−1, and so on, so that identifier derivation information of each of the plurality of RACH configurations may be obtained. In some examples, the first identifier derivation information indicates start offset of an index value of a frequency domain occasion for the first UE to transmit a random access preamble, the random access preamble corresponding to the random access identifier. The method may include: transmit a plurality of pieces of identifier derivation information corresponding to the plurality of RACH configurations, the plurality of pieces of identifier derivation information including information indicating the first identifier derivation information.

In this way, the first UE obtains the first identifier derivation information corresponding to the first RACH configuration from the plurality of pieces of identifier derivation information, or obtains indication information of the first identifier derivation information corresponding to the first RACH configuration from the plurality of pieces of identifier derivation information conveniently and directly.

In some examples, the first identifier derivation information indicates start offset of an index value of a frequency domain occasion for the first UE to transmit a random access preamble, the random access preamble corresponding to the random access identifier. The method may include: determine, according to the plurality of pieces of identifier derivation information corresponding to the plurality of RACH configurations, the number of ROs of frequency division multiplexing supported by each of the plurality of RACH configurations.

For example, the network device transmits a plurality of pieces of identifier derivation information to the first UE, the plurality of pieces of identifier derivation information including first identifier derivation information and second identifier derivation information, and a first RACH configuration being adjacent to a second RACH configuration. Thus, if the first identifier derivation information is 0 and the second identifier derivation information is N1−1, it is determined that the number of ROs of frequency division multiplexing supported by the first RACH configuration is N1.

In some examples, if a plurality of pieces of identifier derivation information corresponding to the plurality of RACH configurations are transmitted to the first UE, the plurality of pieces of identifier derivation information include the first identifier derivation information, the first identifier derivation information indicating start offset of an index value of a frequency domain occasion for the first UE to transmit a random access preamble, and the random access preamble corresponding to the random access identifier. Thus, step S12 may include:

Step S12*b*: determine the index value of the frequency domain occasion for the first UE to transmit the random access preamble according to the first identifier derivation information corresponding to the first RACH configuration and the number of ROs of frequency division multiplexing supported by the first RACH configuration.

For example, the network device transmits a plurality of pieces of identifier derivation information to the first UE, the plurality of pieces of identifier derivation information including first identifier derivation information. If the first identifier derivation information is 0, and the number of ROs of frequency division multiplexing supported by the first RACH configuration is N1, it is determined that the index value of the frequency domain occasion for the first UE to transmit the random access preamble is 0 to N1−1.

In some examples, if a plurality of pieces of identifier derivation information corresponding to the plurality of RACH configurations are transmitted to the first UE, the plurality of pieces of identifier derivation information include the first identifier derivation information. The method may include: not transmitting, for the first UE, indication information of the first identifier derivation information, among the plurality of pieces of identifier derivation information, of the first RACH configuration, to indicate that the first identifier derivation information of the first RACH configuration is 0.

For example, the network device transmits a plurality of pieces of identifier derivation information to the first UE, the plurality of pieces of identifier derivation information excluding the first identifier derivation information, so as to implicitly indicate to the first UE that the first identifier derivation information of the first RACH configuration is 0, and the UE determines that the first identifier derivation information of the first RACH configuration is 0.

In some examples, the method may include:

Step S14 (not shown in FIG. 3): transmit a random access response addressed by the random access identifier.

In this way, since different random access preambles correspond to different random access identifiers, the first UE may distinguish between different random access responses conveniently. In an example, the first UE is in one of the following states:

an idle state, an inactive state, or a connected state.

In an example, the configuration information of the first RACH configuration is transmitted through a broadcast message or RRC dedicated signaling.

In this way, the broadcast message or the RRC dedicated signaling carries the configuration information of the first RACH configuration or the configuration information including the plurality of RACH configurations, so that no new signaling is added or developed, to save on a signaling cost.

According to the technical solutions in the examples of the disclosure, repetition of the RA-RNTIs may be solved by determining different identifier derivation information associated with the random access identifiers for different RACH configurations, so that the UE may distinguish between different random access responses through the RA-RNTIs.

FIG. 4 is a second flow chart of a communication method shown according to an example. The communication method is used in a network device such as a base station. As shown in FIG. 4, the communication method includes:

Step S21, determine, for first UE, a first random access channel (RACH) configuration, the first RACH configuration being different from a second RACH configuration.

Step S22, determine, for the first RACH configuration, a first search space for a random access response associated with the first RACH configuration, the first search space being different from a second search space for a random access response associated with the second RACH configuration.

Step S23, transmit the random access response for the first RACH configuration in the first search space.

In this way, random access responses may be distinguished from one another by allocating different search spaces for transmitting the random access responses to different RACH configurations, so that the UE receives, in corresponding search spaces, different random access responses conveniently.

In some examples, the first RACH configuration is configured for a first network slice, and the second RACH configuration is configured for a second network slice, the first network slice being different from the second network slice.

In this way, when the network device configures the first network slice and the second network slice for the first UE, the first UE may receive configuration information of the first RACH configuration and configuration information of the second RACH configuration.

In some examples, the first RACH configuration is configured for the first UE, and the second RACH configuration is configured for second UE.

In this way, the network device configures different RACH configurations for different UE.

In some examples, the method may include:

determine a plurality of RACH configurations and search space configuration information of a random access response corresponding to each of the RACH configurations, the plurality of RACH configurations including the first RACH configuration and the second RACH configuration.

In some examples, the method may include:

transmit configuration information including the plurality of RACH configurations and the search space configuration information of the random access response corresponding to each of the RACH configurations, the plurality of RACH configurations including the first RACH configuration.

In this way, the UE receives, according to the search space configuration information, the random access response of the first RACH configuration conveniently.

In some examples, the method may include:

determine a random access identifier for the first RACH configuration; and transmit, in a search space for the first RACH configuration, a random access response addressed by the random access identifier.

In this way, the UE may receive, by addressing the random access identifier in the search space for the first RACH configuration, the random access response, to distinguish between random access responses conveniently.

It should be noted that with reference to a derivation method for determining a random access identifier for a first RACH configuration in the method shown in FIG. 3, the random access identifier for the first RACH configuration may be determined, of which a specific process will not be described in detail herein.

In some examples, the method may include:

allocate, in response to determining that the search space for the first RACH configuration is the same as that for another RACH configuration of the plurality of RACH configurations, different identifier derivation information for determining random access identifiers for the first RACH configuration and the another RACH configuration.

In some implementations, the identifier derivation information indicates start offset of an index value of a frequency domain occasion for the first user equipment (UE) to transmit a random access preamble, the random access preamble corresponding to the random access identifier.

In some other implementations, the identifier derivation information indicates an index value of a frequency domain occasion for the first user equipment (UE) to transmit a random access preamble, the random access preamble corresponding to the random access identifier.

In this way, the UE may receive, by addressing different random access identifiers in the same search space, different random access response, to distinguish between the random access responses conveniently.

In some examples, the step of transmitting configuration information including a plurality of RACH configurations and search space configuration information of a random access response corresponding to each of the RACH configurations includes:

transmit configuration information including the plurality of RACH configurations and the search space configuration information of the random access response corresponding to each of the RACH configurations through a broadcast message or dedicated signaling.

In this way, the UE receives the configuration information including the plurality of RACH configurations and the search space configuration information of the random access response corresponding to each of the RACH configurations conveniently.

In some examples, the method may include:

determine a common search space for a common RACH configuration; and exclude a search space for the first RACH configuration from the search space configuration information, to indicate that the search space for the first RACH configuration is the common search space.

In this way, it is possible to indicate to the first UE that the search space for the first RACH configuration is the common search space while saving on a data cost.

For example, the network device transmits configuration information including a plurality of RACH configurations to the first UE, the plurality of RACH configurations including a first RACH configuration. The search space configuration information of random access responses corresponding to other RACH configurations except for the first RACH configuration is transmitted to the first UE. Thus, in this case, the first UE determines that a search space for the first RACH configuration is a common search space.

In an example, the first UE is in one of the following states:

an idle state, an inactive state, or a connected state.

According to the technical solutions in the examples of the disclosure, different random access responses may be distinguished from one another according to search spaces by determining a search space of a random access response associated with the same RACH configuration for different RACH configurations.

Corresponding to the communication method applied to the network device shown in FIG. 3, an example of the disclosure further provides a communication method used in first user equipment (UE). As shown in FIG. 5, the communication method includes:

Step S31, receive configuration information of a first RACH configuration, the first RACH configuration being different from a second RACH configuration.

Step S32, determine, for the first RACH configuration, first identifier derivation information associated with a random access identifier, the first identifier derivation information being different from second identifier derivation information for the second RACH configuration.

Step S33, determine, based on the first identifier derivation information, the random access identifier.

In some examples, the first identifier derivation information indicates start offset of an index value of a frequency domain occasion for the first UE to transmit a random access preamble, the random access preamble corresponding to the random access identifier.

In some examples, the first identifier derivation information indicates an index value of a frequency domain occasion for the first UE to transmit a random access preamble, the random access preamble corresponding to the random access identifier.

In this way, after the first UE transmits the random access preamble according to the first RACH configuration, random access responses transmitted by the network device may be distinguished from one another through the first determined identifier derivation information associated with the random access identifier, so that the random access response is received by addressing the first identifier derivation information.

In some examples, the method may include:

receive configuration information including a plurality of RACH configurations, the plurality of RACH configurations including the first RACH configuration.

In some examples, the first RACH configuration is configured for a first network slice, and the second RACH configuration is configured for a second network slice, the first network slice being different from the second network slice.

In this way, different network slices correspond to different RACH configurations, different RACH configurations correspond to different identifier derivation information associated with the random access identifier, and the UE addresses, based on the random access identifier, the random access response, which is conducive to making the network device return a corresponding random access response according to the random access preamble transmitted on the first RACH configuration.

In some examples, step S32 includes:

Step S32a: determine first identifier derivation information associated with a random access identifier according to an order, among the plurality of RACH configurations, of the first RACH configuration and the number of ROs of frequency division multiplexing supported by the first RACH configuration.

For example, the network device transmits configuration information including a plurality of RACH configurations to the first UE, the plurality of RACH configurations including a first RACH configuration and a second RACH configuration, the second RACH configuration being ranked first or last, and the first RACH configuration being adjacent to the second RACH configuration. Thus, when identifier derivation information indicates start offset of an index value of a frequency domain occasion for the first UE to transmit a random access preamble, it is determined that identifier derivation information corresponding to the second RACH configuration is 0; and if the number of ROs of frequency division multiplexing supported by the second RACH configuration is N1, it is determined that first identifier derivation information corresponding to the first RACH configuration is N1–1. When the identifier derivation information indicates an index value of a frequency domain occasion for the first UE to transmit a random access preamble, and if the number of ROs of frequency division multiplexing supported by the second RACH configuration is N1, it is determined that identifier derivation information corresponding to the second RACH configuration is 0 to N1–1; and if the number of ROs of frequency division multiplexing supported by the first RACH configuration is N2, it is determined that first identifier derivation information corresponding to the first RACH configuration is N1 to N1+N2–1.

In some examples, the plurality of RACH configurations further include a common RACH configuration, and the method may include:

determine, in response to the common RACH configuration being ranked first or last among the plurality of RACH configurations, identifier derivation information corresponding to the common RACH configuration as 0.

The step of determining, for the first RACH configuration, first identifier derivation information associated with a random access identifier includes:

determine, based on the identifier derivation information corresponding to the common RACH configuration, the first identifier derivation information corresponding to the first RACH configuration.

For example, the network device transmits configuration information including the plurality of RACH configurations to the first UE, the plurality of RACH configurations including a common RACH configuration and a first RACH configuration, the common RACH configuration being ranked first or last, and the first RACH configuration being adjacent to the common RACH configuration. Thus, it is determined that identifier derivation information corresponding to the common RACH configuration is 0; and if the number of ROs of frequency division multiplexing supported by the common RACH configuration is N1, it is determined that identifier derivation information corresponding to the first RACH configuration is N1–1.

In some examples, the plurality of RACH configurations further include a common RACH configuration, and the method may include:

determine, in response to the common RACH configuration being ranked first or last among the plurality of RACH configurations, identifier derivation information corresponding to the common RACH configuration as 0 to N1–1, N1 being the number of ROs of frequency division multiplexing supported by the common RACH configuration.

The step of determining, for the first RACH configuration, first identifier derivation information associated with a random access identifier includes:

determine, based on the identifier derivation information corresponding to the common RACH configuration, the first identifier derivation information corresponding to the first RACH configuration.

For example, the network device transmits configuration information including a plurality of RACH configurations to the first UE, the plurality of RACH configurations including a common RACH configuration and a first RACH configuration, the common RACH configuration being ranked first or last, and the first RACH configuration being adjacent to the common RACH configuration. Thus, if the number of ROs of frequency division multiplexing supported by the common RACH configuration is N1, it is determined that identifier derivation information corresponding to the common RACH configuration is 0 to N1–1; and if the number of ROs of frequency division multiplexing supported by the first RACH configuration is N2, it is determined that identifier derivation information corresponding to the first RACH configuration is N1 to N2+N1–1.

In some examples, the first identifier derivation information indicates start offset of an index value of a frequency domain occasion for the first UE to transmit a random access preamble, the random access preamble corresponding to the random access identifier. In some examples, the method may include:

receive a plurality of pieces of identifier derivation information corresponding to the plurality of RACH configurations, the plurality of pieces of identifier derivation information including information indicating the first identifier derivation information.

In this way, the first UE determines the first identifier derivation information from the plurality of pieces of identifier derivation information conveniently.

In some examples, the method may include:

determine, according to the plurality of pieces of identifier derivation information corresponding to the plurality of RACH configurations, the number of ROs of frequency division multiplexing supported by each of the plurality of RACH configurations.

For example, the network device transmits a plurality of pieces of identifier derivation information to the first UE, the plurality of pieces of identifier derivation information including first identifier derivation information and/or second identifier derivation information, and a first RACH configuration being adjacent to a second RACH configuration. Thus, if the first identifier derivation information is 0 and the second identifier derivation information is N1–1, it is determined that the number of ROs of frequency division multiplexing supported by the first RACH configuration is N1.

In some examples, the step of determining, for the first RACH configuration, first identifier derivation information associated with a random access identifier includes:

determine, according to the first identifier derivation information corresponding to the first RACH configuration and the number of the ROs of frequency division multiplexing supported by the first RACH configuration, the index value of the frequency domain occasion for the first UE to transmit the random access preamble.

For example, the network device transmits a plurality of pieces of identifier derivation information to the first UE, the plurality of pieces of identifier derivation information including information indicating the first identifier derivation information. If the first identifier derivation information is 0, and the number of ROs of frequency division multiplexing supported by the first RACH configuration is N1, it is determined that the index value of the frequency domain occasion for the first UE to transmit the random access preamble is 0 to N1–1.

In some examples, the method may include: determine, in response to that the plurality of pieces of identifier derivation information exclude the first identifier derivation information of the first RACH configuration, the first identifier derivation information of the first RACH configuration as 0.

For example, the network device transmits a plurality of pieces of identifier derivation information to the first UE, the plurality of pieces of identifier derivation information excluding the first identifier derivation information, so as to implicitly indicate that the first identifier derivation information of the first RACH configuration is 0, and the UE determines that the first identifier derivation information of the first RACH configuration is 0.

In an example, the configuration information of the first RACH configuration is transmitted through a broadcast message or RRC dedicated signaling.

In an example, the first UE is in one of the following states:

an idle state, an inactive state, or a connected state.

According to the technical solutions in the examples of the disclosure, repetition of RA-RNTIs may be solved by determining different identifier derivation information associated with the random access identifiers for different RACH configurations, so that the UE may distinguish between different random access responses through the RA-RNTIs.

Corresponding to a communication method applied to a network device shown in FIG. 4, an example of the disclosure further provides a communication method used in first user equipment (UE). As shown in FIG. 6, the communication method includes:

Step S41, receive configuration information of a first random access channel (RACH) configuration, the first RACH configuration being different from a second RACH configuration.

Step S42, receive, in response to receiving search space configuration information of a first search space for a random access response associated with the first RACH configuration, the random access response for the first RACH configuration in the first search space, the first search space being different from a second search space for a random access response associated with the second RACH configuration.

In this way, the UE receives, in corresponding search spaces, different random access responses conveniently by distinguishing between the random access responses through the search spaces.

In some examples, the first RACH configuration is configured for a first network slice, and the second RACH configuration is configured for a second network slice, the first network slice being different from the second network slice.

In some examples, the first RACH configuration is configured for the first UE, and the second RACH configuration is configured for second UE.

In an example, the method may include:

receive configuration information including a plurality of RACH configurations and search space configuration information of a random access response corresponding to each of the RACH configurations, the plurality of RACH configurations including the first RACH configuration.

In an example, the method may include:

determine a random access identifier for the first RACH configuration.

The step of receiving the random access response for the first RACH configuration in the first search space includes:

receive, by addressing the random access identifier in a search space for the first RACH configuration, the random access response.

In this way, the UE receives, according to the search space configuration information, the random access response of the first RACH configuration conveniently.

It should be noted that with reference to a derivation method for determining a random access identifier for a first RACH configuration in the method shown in FIG. 3, the random access identifier for the first RACH configuration may be determined, of which a specific process will not be described in detail herein.

In an example, the method may include:

allocating, in response to determining that the search space for the first RACH configuration is the same as that for another RACH configuration of the plurality of RACH configurations, different identifier derivation information for determining random access identifiers for the first RACH configuration and the another RACH configuration.

In some implementations, the identifier derivation information indicates start offset of an index value of a frequency domain occasion for the first user equipment (UE) to transmit a random access preamble, the random access preamble corresponding to the random access identifier.

In some implementations, the identifier derivation information indicates an index value of a frequency domain occasion for the first user equipment (UE) to transmit a random access preamble, the random access preamble corresponding to the random access identifier.

In this way, the UE may receive, by addressing different random access identifiers in the same search space, the random access responses, to distinguish between the random access responses.

In an example, the step of receiving configuration information including a plurality of RACH configurations and search space configuration information of a random access response corresponding to each of the RACH configurations includes:

receive the configuration information including the plurality of RACH configurations and the search space configuration information of the random access response corresponding to each of the RACH configurations transmitted through a broadcast message or dedicated signaling.

In this way, the UE obtains the configuration information including the plurality of RACH configurations and the search space configuration information of the random access response corresponding to each of the RACH configurations conveniently.

In an example, the method may include:

determine a common search space for a common RACH configuration; and exclude a search space for the first RACH configuration from the search space configuration information, to determine that the search space for the first RACH configuration is the common search space.

For example, the network device transmits configuration information including a plurality of RACH configurations to the first UE, the plurality of RACH configurations including a first RACH configuration. The search space configuration information of random access responses corresponding to other RACH configurations except for the first RACH configuration is transmitted to the first UE. Thus, in this case, the first UE determines that a search space for the first RACH configuration is a common search space.

In an example, the first UE is in one of the following states:

an idle state, an inactive state, or a connected state.

According to the technical solutions in the examples of the disclosure, different random access responses may be distinguished from one another according to search spaces by determining a search space of a random access response associated with the same RACH configuration for different RACH configurations.

Corresponding to the communication method applied to the network device shown in FIG. 3, an example of the disclosure further provides a communication apparatus used in a network device such as a base station. As shown in FIG.

7, the apparatus includes a first determination unit 10, a second determination unit 20, and a derivation unit 30, where the first determination unit 10 is configured for determining, for first UE, a first RACH configuration, the first RACH configuration being different from a second RACH configuration;

a second determination unit 20 is configured for determining, for the first RACH configuration, first identifier derivation information associated with a random access identifier, the first identifier derivation information being different from second identifier derivation information for the second RACH configuration; and the derivation unit 30 is configured for determining, based on the first identifier derivation information, the random access identifier.

In some examples, the apparatus further includes:

a fourth communication unit 40 configured for transmitting a plurality of pieces of identifier derivation information corresponding to the plurality of RACH configurations, the plurality of pieces of identifier derivation information including information indicating the first identifier derivation information.

In some examples, the fourth communication unit 40 is configured for transmitting a random access response addressed by the random access identifier.

For the apparatus in the example described above, a specific method for each module to execute an operation has been described in detail in the example relating to the method, and will not be described in detail herein.

In practical applications, specific structures of the first determination unit 10, the second determination unit 20, the derivation unit 30, and the fourth communication unit 40 described above may all be implemented by a central processing unit (CPU), a micro controller unit (MCU), a digital signal processing (DSP), a programmable logic controller (PLC) or the like in the communication apparatus or a device to which the communication apparatus belongs.

It should be understood by those skilled in the art that functions of all processing modules in the communication apparatus in the example of the disclosure may be understood with reference to the relevant description of the communication method shown in FIG. 3. All the processing modules in the communication apparatus in the example of the disclosure may be implemented by analog circuits for implementing the functions in the example of the disclosure or by running software executing the functions in the example of the disclosure on the device.

According to the communication apparatus in the example of the disclosure, repetition of RA-RNTIs may be solved, so that the UE may distinguish between different random access responses through the RA-RNTIs.

Figure 8:
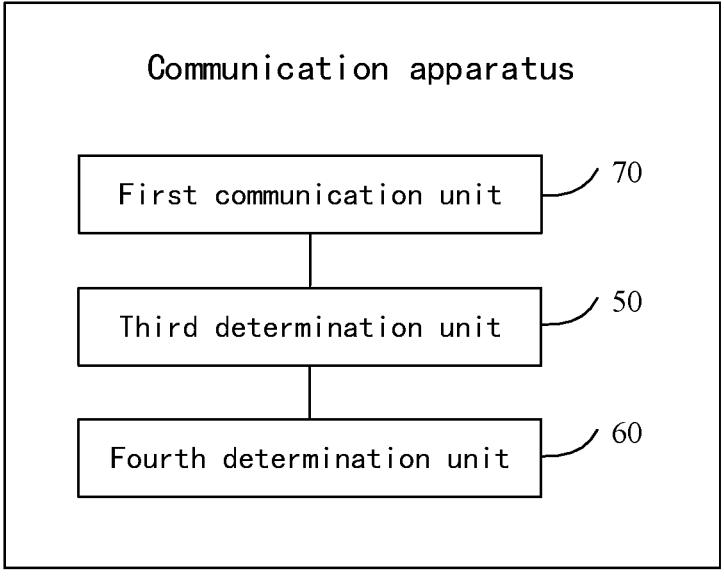
FIG. 8 is a second block diagram of a communication apparatus shown according to an example.

Corresponding to the communication method applied to the network device shown in FIG. 4, an example of the disclosure further provides a communication apparatus used in a network device such as a base station. As shown in FIG. 8, the apparatus includes a third determination unit 50, a fourth determination unit 60, and a first communication unit 70, where the third determination unit 50 is configured for determining, for first UE, a first RACH configuration, the first RACH configuration being different from a second RACH configuration;

the fourth determination unit 60 is configured for determining, for the first RACH configuration, a first search space for a random access response associated with the first RACH configuration, the first search space being different from a second search space for a random access response associated with the second RACH configuration; and the first communication unit 70 is configured for transmitting the random access response for the first RACH configuration in the first search space.

For the apparatus in the example described above, a specific method for each module to execute an operation has been described in detail in the example relating to the method, and will not be described in detail herein.

In practical applications, specific structures of the third determination unit 50, the fourth determination unit 60, and the first communication unit 70 described above may all be implemented by a central processing unit (CPU), an MCU, DSP, a PLC or the like in the communication apparatus or a device to which the communication apparatus belongs.

It should be understood by those skilled in the art that functions of all processing modules in the communication apparatus in the example of the disclosure may be understood with reference to the relevant description of the foregoing communication method shown in FIG. 4. All the processing modules in the communication apparatus in the example of the disclosure may be implemented by analog circuits for implementing the functions in the example of the disclosure or by running software executing the functions in the example of the disclosure on a terminal.

According to the communication apparatus in the example of the disclosure, different random access responses may be distinguished from one another.

Figure 9:
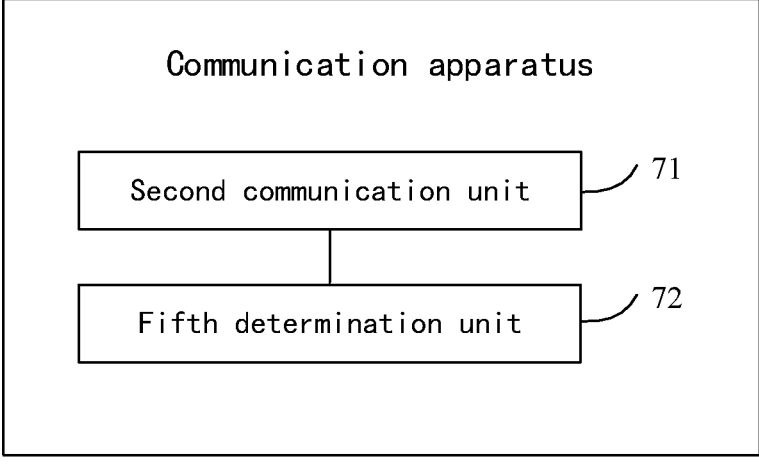
FIG. 9 is a third block diagram of a communication apparatus shown according to an example.

Corresponding to the communication method applied to the first UE shown in FIG. 5, an example of the disclosure further provides a communication apparatus used in first UE. As shown in FIG. 9, the apparatus includes a second communication unit 71 and a fifth determination unit 72, where the second communication unit 71 is configured for receiving configuration information of a first random access channel (RACH) configuration, the first RACH configuration being different from a second RACH configuration;

the fifth determination unit 72 is configured for determining, for the first RACH configuration, first identifier derivation information associated with a random access identifier, the first identifier derivation information being different from second identifier derivation information for the second RACH configuration; and the second communication unit 72 is further configured for determining, based on the first identifier derivation information, the random access identifier.

For the apparatus in the example described above, a specific method for each module to execute an operation has been described in detail in the example relating to the method, and will not be described in detail herein.

In practical applications, specific structures of the second communication unit 71 and the fifth determination unit 72 described above may both be implemented by a central processing unit (CPU), an MCU, DSP, a PLC or the like in the communication apparatus or a device to which the communication apparatus belongs.

It should be understood by those skilled in the art that functions of all processing modules in the communication apparatus in the example of the disclosure may be understood with reference to the relevant description of the foregoing communication method shown in FIG. 5. All the processing modules in the communication apparatus in the example of the disclosure may be implemented by analog circuits for implementing the functions in the example of the disclosure or by running software executing the functions in the example of the disclosure on the device.

According to the communication apparatus in the example of the disclosure, different random access responses may be distinguished from one another.

Figure 10:
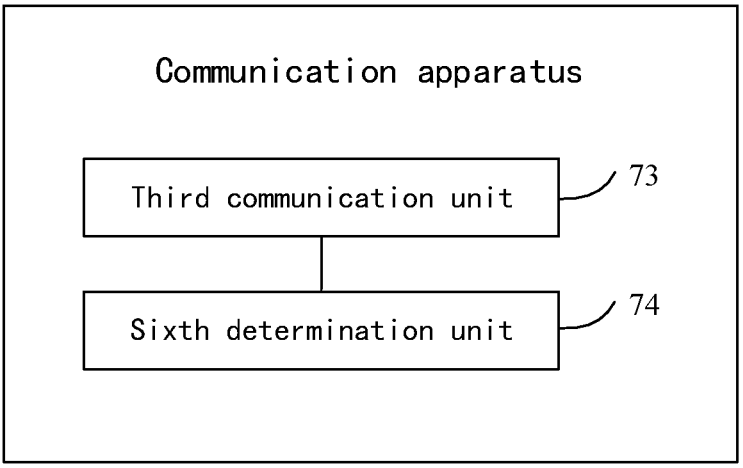
FIG. 10 is a fourth block diagram of a communication apparatus shown according to an example.

Corresponding to the communication method applied to the first UE shown in FIG. 6, an example of the disclosure further provides a communication apparatus used in first UE. As shown in FIG. 10, the apparatus includes a third communication unit 73 and a sixth determination unit 74, where the third communication unit 73 is configured for receiving configuration information of a first RACH configuration, the first RACH configuration being different from a second RACH configuration; and the sixth determination unit 74 is configured for receiving, in response to receiving search space configuration information of a first search space for a random access response associated with the first RACH configuration, the random access response for the first RACH configuration in the first search space, the first search space being different from a second search space for a random access response associated with the second RACH configuration.

For the apparatus in the example described above, a specific method for each module to execute an operation has been described in detail in the example relating to the method, and will not be described in detail herein.

In practical applications, specific structures of the third communication unit 73 and the fifth determination unit 74 described above may both be implemented by a central processing unit (CPU), an MCU, DSP, a PLC or the like in the communication apparatus or a device to which the communication apparatus belongs.

It should be understood by those skilled in the art that functions of all processing modules in the communication apparatus in the example of the disclosure may be understood with reference to the relevant description of the foregoing communication method shown in FIG. 6. All the processing modules in the communication apparatus in the example of the disclosure may be implemented by analog circuits for implementing the functions in the example of the disclosure or by running software executing the functions in the example of the disclosure on a terminal.

According to the communication apparatus in the example of the disclosure, different random access responses may be distinguished from one another.

An example of the application further describes a communication apparatus. The apparatus includes: a memory, a processor, and a computer program stored on the memory and operable on the processor, where the processor implements the communication method provided by any of the foregoing technical solutions when executing the program.

An example of the application further describes a computer storage medium. The computer storage medium stores a computer-executable instruction, and the computer-executable instruction is used for executing the communication method in each of the foregoing examples. That is to say, after being executed by the processor, the computer-executable instruction may implement the communication method provided in any of the foregoing technical solutions.

It should be understood by those skilled in the art that functions of all programs in the computer storage medium in the present example may be understood with reference to the relevant description of the communication method in each of the foregoing examples.

Figure 11:
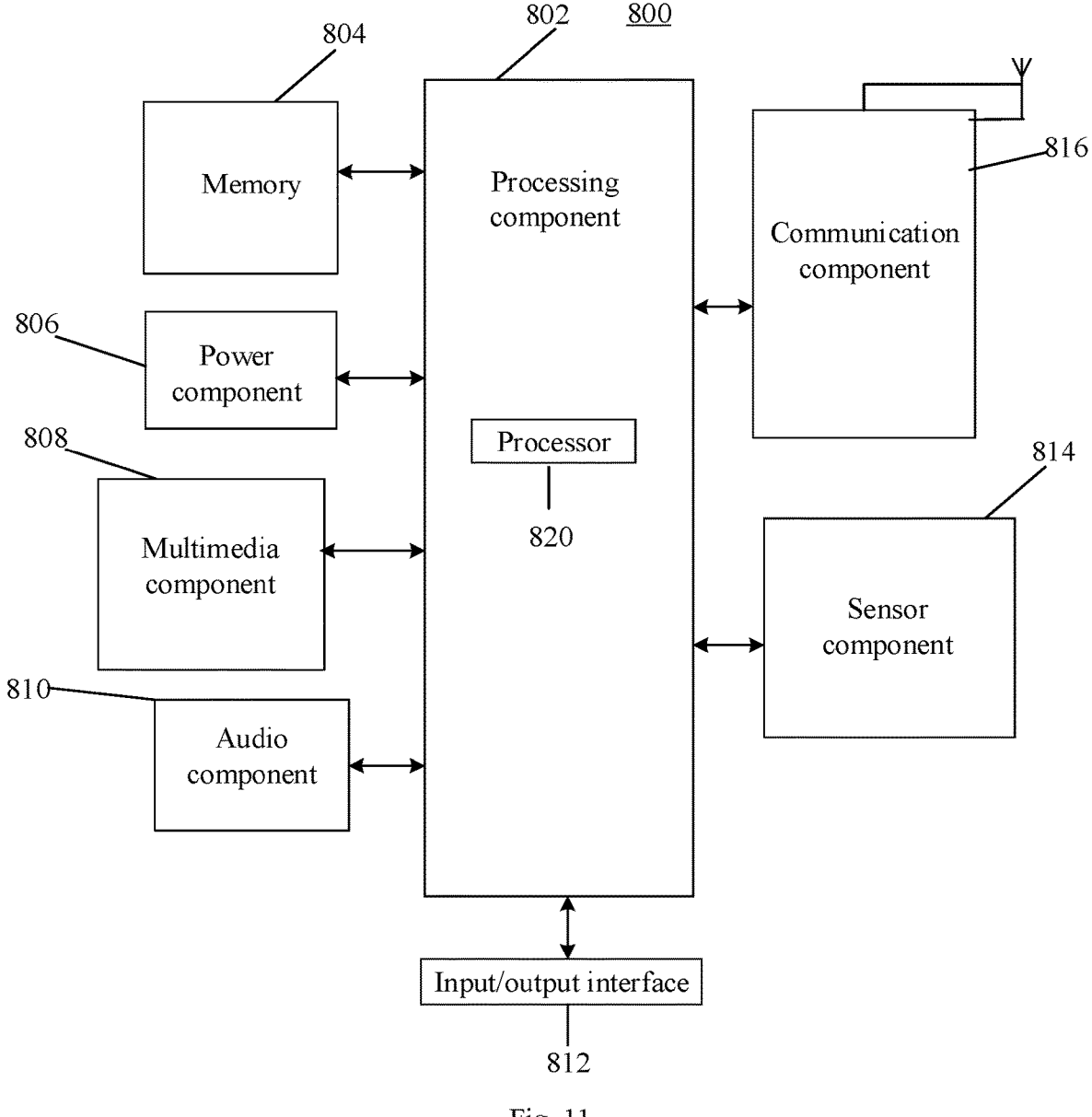
FIG. 11 is a block diagram of a communication processing apparatus 800 shown according to an example.

FIG. 11 is a block diagram of a communication apparatus 800 shown according to an example. For example, the apparatus 800 may be a mobile phone, a computer, a digital broadcast terminal, a message transceiving device, a game console, a tablet device, a medical device, a fitness device, a personal digital assistant or the like.

With reference to FIG. 11, the apparatus 800 may include one or more of the following assemblies: a processing component 802, a memory 804, a power component 806, a multimedia component 808, an audio component 810, an input/output (I/O) interface 812, a sensor component 814, and a communication component 816.

Generally, the processing component 802 controls an overall operation of the apparatus 800, such as operations associated with display, telephone calls, data communication, a camera operation, and a recording operation. The processing component 802 may include one or more processors 820, to execute instructions, so as to complete all or some of steps of the methods described above. Moreover, the processing component 802 may include one or more modules that facilitate interaction between the processing component 802 and other assemblies. For example, the processing component 802 may include a multimedia module, to facilitate interaction between the multimedia component 808 and the processing component 802.

The memory 804 is configured for storing various types of data, to support the operations on the apparatus 800. For example, these data include instructions for any application or method operating on the apparatus 800, contact data, phonebook data, messages, pictures, video, etc. The memory 804 may be implemented through any type of volatile or non-volatile memory devices or their combination, such as a static random-access memory (SRAM), an electrically-erasable programmable read-only memory (EEPROM), an erasable programmable read only memory (EPROM), a programmable read-only memory (PROM), a read only memory (ROM), a magnetic memory, a flash memory, a magnetic or optical disk.

The power component 806 provides power for various assemblies of the apparatus 800. The power component 806 may include a power supply management system, one or more power supplies, and other assemblies associated with generating, managing, and distributing power for the apparatus 800.

The multimedia component 808 includes a screen that provides an output interface between the apparatus 800 and a user. In some examples, the screen may include a liquid crystal display (LCD) and a touch panel (TP). With the touch panel included, the screen may be implemented as a touch screen, to receive an input signal from the user. The touch panel includes one or more touch sensors, to sense touches, swipes, and gestures on the touch panel. Except for sensing a boundary of a touch or swipe action, the touch sensor may also detect a duration and a pressure associated with a touch or swipe operation. In some examples, the multimedia component 808 includes a front-facing camera and/or a rear-facing camera. When the apparatus 800 is in an operation mode, such as a photographing mode or a video mode, the front-facing camera and/or the rear-facing camera may receive external multimedia data. Each of the front-facing camera and the rear-facing camera may be a fixed optical lens system or have a focal length and an optical zoom capacity.

The audio component 810 is configured for outputting and/or inputting audio signals. For example, the audio component 810 includes a microphone (MIC) configured for receiving external audio signals when the apparatus 800 is in operating modes, such as a call mode, a recording mode, and a voice recognition mode. The received audio signals may be further stored in the memory 804 or transmitted via the communication component 816. In some examples, the audio component 810 further includes a speaker for outputting the audio signals.

The I/O interface 812 provides an interface between the processing component 802 and a peripheral interface module such as a keyboard, a click wheel, a button, etc. These buttons may include, but are not limited to: a home button, a volume button, a start button, and a lock button.

The sensor component 814 includes one or more sensors for providing state assessments of various aspects of the apparatus 800. For example, the sensor component 814 may detect an opened/closed state of the apparatus 800, and relative positioning of the assemblies, such as a display and a keypad of the apparatus 800. The sensor component 814 may further detect a change in position of the apparatus 800 or an component of the apparatus 800, a presence or not of contact between the user and the apparatus 800, orientation or acceleration/deceleration of the apparatus 800, and a change in temperature of the apparatus 800. The sensor component 814 may include a proximity sensor configured for detecting the presence of a nearby object in the absence of any physical contact. The sensor component 814 may further include an optical sensor, such as a complementary metal oxide semiconductor (CMOS) or charge-coupled device (CCD) image sensor, for use in imaging applications. In some examples, the sensor component 814 may further include an acceleration sensor, a gyroscopic sensor, a magnetic sensor, a pressure sensor, or a temperature sensor.

The communication component 816 is configured for facilitating wired or radio communication between the apparatus 800 and other devices. The apparatus 800 may access a radio network based on a communication standard, such as Wi-Fi, 2G or 3 G, or their combination. In an example, the communication component 816 receives a broadcast signal or broadcast related information from an external broadcast management system via a broadcast channel. In an example, the communication component 816 further includes a near field communication (NFC) module, to facilitate short-range communication. For example, the NFC module may be implemented based on a radio frequency identification (RFID) technology, an infrared data association (IrDA) technology, an ultra wide band (UWB) technology, a Blue Tooth (BT) technology, etc.

In an example, the apparatus 800 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or the like for executing the communication methods described above.

In an example, further provided is a non-transitory computer storage medium including executable instructions, for example a memory 804 including executable instructions which may be executed by a processor 820 of an apparatus 800, to complete the methods described above. For example, the non-transitory computer storage medium may be an ROM, a random access memory (RAM), a compact disk (CD)-ROM, a magnetic tape, a floppy disk, an optical data storage devices, etc.

Figure 12:
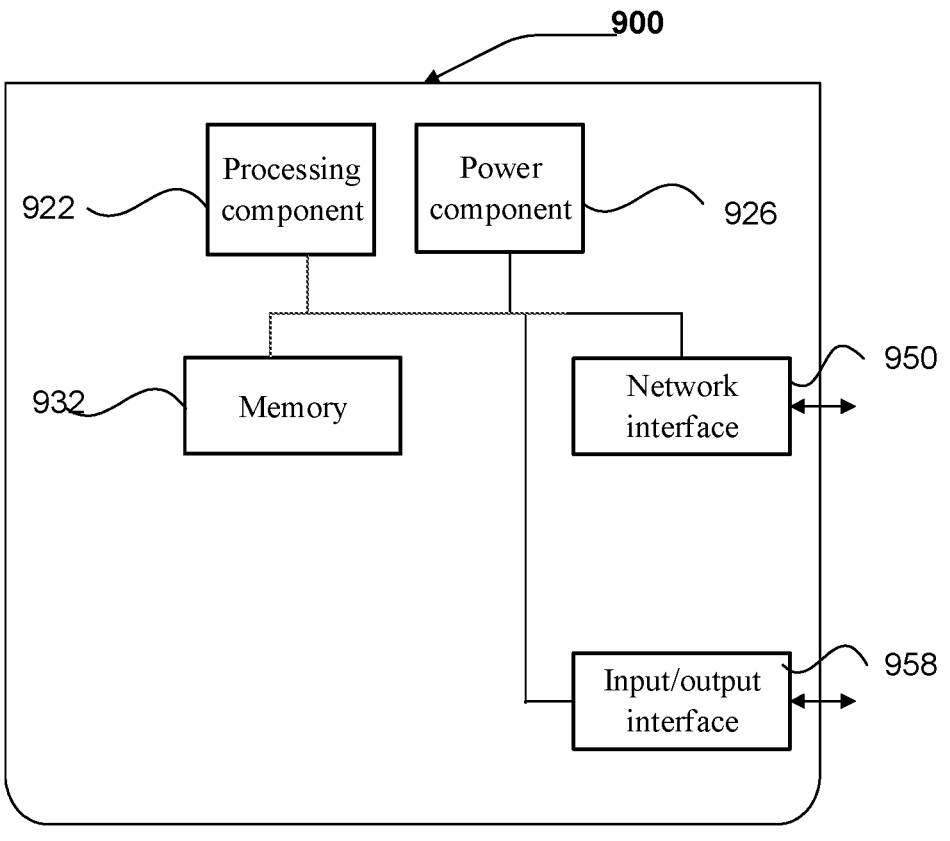
FIG. 12 is a block diagram of a communication processing apparatus 900 shown according to an example.

FIG. 12 is a block diagram of a communication apparatus 900 shown according to an example. For example, the apparatus 900 may be provided as a server. With reference to FIG. 12, the apparatus 900 includes a processing component 922 and further includes one or more processors, and a memory resource represented by a memory 932 for storing instructions, such as applications that may executed by the processing component 922. The applications stored in the memory 932 may include one or more modules that each correspond to a set of instructions. Moreover, the processing component 922 is configured for executing the instructions, to execute the communication method described above.

The apparatus 900 may further include a power supply component 926 configured for executing power management of the apparatus 900, a wired or radio network interface 950 configured for connecting the apparatus 900 to a network, and an input/output (I/O) interface 958. The apparatus 900 may operate based on an operating system stored in the memory 932, such as Windows Server™, Mac OS X™, Unix™, Linux™, FreeBSD™ or the like.

The technical solutions described in the examples of the disclosure may be combined with one another randomly without conflict.

Other implementation solutions to the disclosure will be easily conceived by those skilled in the art in consideration of the description and practice of the disclosure disclosed herein. The application is intended to cover any variations, uses, or adaptive changes of the disclosure following the general principles of the disclosure and including common general knowledge or conventional technical means within the present technical field not disclosed in the disclosure. The description and the examples are deemed exemplary only, and the true scope and spirit of the disclosure are indicated by the following claims.

It is to be understood that the disclosure is not limited to precise structures which have been described above and shown in the accompanying drawings, and may have various modifications and changes without departing from the scope of the disclosure. The scope of the disclosure is limited by the appended claims only.

In a first aspect, an example of the disclosure provides a communication method, including:

determining, for first user equipment (UE), a first random access channel (RACH) configuration, the first RACH configuration being different from a second RACH configuration;

determining, for the first RACH configuration, first identifier derivation information associated with a random access identifier, the first identifier derivation information being different from second identifier derivation information for the second RACH configuration; and determining, based on the first identifier derivation information, the random access identifier.

In an example, the method may include:

determining a plurality of RACH configurations, the plurality of RACH configurations including the first RACH configuration and the second RACH configuration.

In an example, the determining a plurality of RACH configurations includes determining an order of the plurality of RACH configurations; and the determining, for the first RACH configuration, first identifier derivation information associated with a random access identifier includes:

determining the first identifier derivation information associated with the random access identifier according to an order, among the plurality of RACH configurations, of the first RACH configuration and the number of random access channel occasions (ROs) of frequency division multiplexing supported by the first RACH configuration.

In an example, the first identifier derivation information indicates start offset of an index value of a frequency domain occasion for the first UE to transmit a random access preamble, the random access preamble corresponding to the random access identifier.

In an example, the first identifier derivation information indicates an index value of a frequency domain occasion for the first UE to transmit a random access preamble, the random access preamble corresponding to the random access identifier.

In an example, the determining first identifier derivation information associated with a random access identifier includes:

determining a value of the first identifier derivation information as start offset of a previous neighboring RACH configuration immediately before the first RACH configuration in the order of the plurality of RACH configurations plus the number of ROs supported by the previous neighboring RACH configuration; and when the first RACH configuration is the first one in the order of the plurality of RACH configurations, the value of the first identifier derivation information is predetermined start offset.

In an example, the determining first identifier derivation information associated with a random access identifier includes: determining a plurality of pieces of first identifier derivation information for the first RACH configuration sequentially and incrementally at a fixed step size from an index value of a last RO among a plurality of ROs of a previous neighboring RACH configuration immediately before the first RACH configuration in the order of the plurality of RACH configurations, where when the first RACH configuration is the first one in the order of the plurality of RACH configurations, the plurality of pieces of first identifier derivation information for the first RACH configuration are determined sequentially and incrementally at the fixed step size from a predetermined fixed value.

In an example, the second RACH configuration is configured for second UE.

In an example, the first RACH configuration is configured for a first network slice, and the second RACH configuration is configured for a second network slice, the first network slice being different from the second network slice.

In an example, the plurality of RACH configurations further include a common RACH configuration, and the method may include:

determining, in response to determining that the common RACH configuration is ranked first or last among the plurality of RACH configurations, identifier derivation information corresponding to the common RACH configuration as 0.

In an example, the plurality of RACH configurations further include a common RACH configuration, and the method may include:

determining, in response to determining that the common RACH configuration is ranked first or last among the plurality of RACH configurations, identifier derivation information corresponding to the common RACH configuration as 0 to N1−1, N1 being the number of ROs of frequency division multiplexing supported by the common RACH configuration.

In an example, the method may include:

transmitting a plurality of pieces of identifier derivation information corresponding to the plurality of RACH configurations, the plurality of pieces of identifier derivation information including information indicating the first identifier derivation information.

In an example, the method may include:

determining, according to the plurality of pieces of identifier derivation information corresponding to the plurality of RACH configurations, the number of ROs of frequency division multiplexing supported by each of the plurality of RACH configurations.

In an example, the determining, for the first RACH configuration, first identifier derivation information associated with a random access identifier includes:

determining, according to the first identifier derivation information corresponding to the first RACH configuration and the number of the ROs of frequency division multiplexing supported by the first RACH configuration, the index value of the frequency domain occasion for the first UE to transmit the random access preamble.

In an example, the method may include: not transmitting, for the first UE, indication information of the first identifier derivation information, among the plurality of pieces of identifier derivation information, of the first RACH configuration, to indicate that the first identifier derivation information of the first RACH configuration is 0.

In an example, the method may include:

transmitting a random access response addressed by the random access identifier.

In an example, the first UE is in one of the following states:

an idle state, an inactive state, or a connected state.

In an example, configuration information of the first RACH configuration is transmitted through a broadcast message or radio resource control (RRC) dedicated signaling.

In a second aspect, an example of the disclosure provides a communication method, including:

determining, for first UE, a first RACH configuration, the first RACH configuration being different from a second RACH configuration;

determining, for the first RACH configuration, a first search space for a random access response associated with the first RACH configuration, the first search space being different from a second search space for a random access response associated with the second RACH configuration; and transmitting the random access response for the first RACH configuration in the first search space.

In an example, the method may include:

determining a plurality of RACH configurations and search space configuration information of a random access response corresponding to each of the RACH configurations, the plurality of RACH configurations including the first RACH configuration and the second RACH configuration.

In an example, the method may include:

determining a random access identifier for the first RACH configuration; and transmitting, in a search space for the first RACH configuration, a random access response addressed by the random access identifier.

In an example, the method may include:

allocating, in response to determining that the search space for the first RACH configuration is the same as that for another RACH configuration of the plurality of RACH configurations, different identifier derivation information for determining random access identifiers for the first RACH configuration and the another RACH configuration.

In an example, the identifier derivation information indicates start offset of an index value of a frequency domain occasion for the first user equipment (UE) to transmit a random access preamble, the random access preamble corresponding to the random access identifier.

In an example, the identifier derivation information indicates an index value of a frequency domain occasion for the first user equipment (UE) to transmit a random access preamble, the random access preamble corresponding to the random access identifier.

In an example, the method may include:

transmitting configuration information including a plurality of RACH configurations and search space configuration information of a random access response corresponding to each of the RACH configurations through a broadcast message or dedicated signaling.

In an example, the method may include:

determining a common search space for a common RACH configuration; and excluding a search space for the first RACH configuration from the search space configuration information, to indicate that the search space for the first RACH configuration is the common search space.

In an example, the first UE is in one of the following states:

an idle state, an inactive state, or a connected state.

In an example, the first RACH configuration is configured for a first network slice, and the second RACH configuration is configured for a second network slice, the first network slice being different from the second network slice.

In an example, the second RACH configuration is configured for second UE.

In a third aspect, an example of the disclosure provides a communication method, applied to first user equipment (UE) and including:

receiving configuration information of a first random access channel (RACH) configuration, the first RACH configuration being different from a second RACH configuration;

determining, for the first RACH configuration, first identifier derivation information associated with a random access identifier, the first identifier derivation information being different from second identifier derivation information for the second RACH configuration; and determining, based on the first identifier derivation information, the random access identifier.

In an example, the method may include:

receiving configuration information including a plurality of RACH configurations, the plurality of RACH configurations including the first RACH configuration.

In an example, the determining, for the first RACH configuration, first identifier derivation information associated with a random access identifier includes:

determining the first identifier derivation information associated with the random access identifier according to an order, among the plurality of RACH configurations, of the first RACH configuration and the number of random access channel occasions (ROs) of frequency division multiplexing supported by the first RACH configuration.

In an example, the first identifier derivation information indicates start offset of an index value of a frequency domain occasion for the first UE to transmit a random access preamble, the random access preamble corresponding to the random access identifier.

In an example, the first identifier derivation information indicates an index value of a frequency domain occasion for the first UE to transmit a random access preamble, the random access preamble corresponding to the random access identifier.

In an example, the determining first identifier derivation information associated with a random access identifier includes:

determining a value of the first identifier derivation information as start offset of a previous neighboring RACH configuration immediately before the first RACH configuration in the order of the plurality of RACH configurations plus the number of ROs supported by the previous neighboring RACH configuration; and when the first RACH configuration is the first one in the order of the plurality of RACH configurations, the value of the first identifier derivation information is predetermined start offset.

In an example, the determining first identifier derivation information associated with a random access identifier includes: determining a plurality of pieces of first identifier derivation information for the first RACH configuration sequentially and incrementally at a fixed step size from an index value of a last RO among a plurality of ROs of a previous neighboring RACH configuration immediately before the first RACH configuration in the order of the plurality of RACH configurations, where when the first RACH configuration is the first one in the order of the plurality of RACH configurations, the plurality of pieces of first identifier derivation information for the first RACH configuration are determined sequentially and incrementally at the fixed step size from a predetermined fixed value.

In an example, the second RACH configuration is configured for second UE.

In an example, the first RACH configuration is configured for a first network slice, and the second RACH configuration is configured for a second network slice, the first network slice being different from the second network slice.

In an example, the plurality of RACH configurations further include a common RACH configuration, and the method may include:

determining, in response to the common RACH configuration being ranked first or last among the plurality of RACH configurations, identifier derivation information corresponding to the common RACH configuration as 0.

In an example, the plurality of RACH configurations further include a common RACH configuration, and the method may include:

determining, in response to the common RACH configuration being ranked first or last among the plurality of RACH configurations, identifier derivation information corresponding to the common RACH configuration as 0 to N1−1, N1 being the number of ROs of frequency division multiplexing supported by the common RACH configuration.

In an example, the method may include:

receiving a plurality of pieces of identifier derivation information corresponding to the plurality of RACH configurations, the plurality of pieces of identifier derivation information including information indicating the first identifier derivation information.

In an example, the method may include:

determining, according to the plurality of pieces of identifier derivation information corresponding to the plurality of RACH configurations, the number of ROs of frequency division multiplexing supported by each of the plurality of RACH configurations.

In an example, the determining, for the first RACH configuration, first identifier derivation information associated with a random access identifier includes:

determining, according to the first identifier derivation information corresponding to the first RACH configuration and the number of the ROs of frequency division multiplexing supported by the first RACH configuration, the index value of the frequency domain occasion for the first UE to transmit the random access preamble.

In an example, the method may include: determining, in response to that the plurality of pieces of identifier derivation information exclude the first identifier derivation information of the first RACH configuration, the first identifier derivation information of the first RACH configuration as 0.

In an example, the method may include: receiving a random access response by addressing the random access identifier.

In an example, the first UE is in one of the following states:

an idle state, an inactive state, or a connected state.

In an example, configuration information of the first RACH configuration is transmitted through a broadcast message or RRC dedicated signaling.

In a fourth aspect, an example of the disclosure provides a communication method, applied to first UE and including:

receiving configuration information of a first random access channel (RACH) configuration, the first RACH configuration being different from a second RACH configuration; and receiving, in response to receiving search space configuration information of a first search space for a random access response associated with the first RACH configuration, the random access response for the first RACH configuration in the first search space, the first search space being different from a second search space for a random access response associated with the second RACH configuration.

In an example, the first RACH configuration is configured for a first network slice, and the second RACH configuration is configured for a second network slice, the first network slice being different from the second network slice.

In an example, the method may include:

receiving configuration information including a plurality of RACH configurations and search space configuration information of a random access response corresponding to each of the RACH configurations, the plurality of RACH configurations including the first RACH configuration.

In an example, the method may include:

determining a random access identifier for the first RACH configuration; and the receiving the random access response for the first RACH configuration in the first search space includes:

receiving, in a search space for the first RACH configuration, a random access response addressed by the random access identifier.

In an example, the method may include:

allocating, in response to determining that the search space for the first RACH configuration is the same as that for another RACH configuration of the plurality of RACH configurations, different identifier derivation information for determining random access identifiers for the first RACH configuration and the another RACH configuration.

In an example, the identifier derivation information indicates start offset of an index value of a frequency domain occasion for the first user equipment (UE) to transmit a random access preamble, the random access preamble corresponding to the random access identifier.

In an example, the identifier derivation information indicates an index value of a frequency domain occasion for the first user equipment (UE) to transmit a random access preamble, the random access preamble corresponding to the random access identifier.

In an example, the receiving configuration information including a plurality of RACH configurations and search space configuration information of a random access response corresponding to each of the RACH configurations includes:

receiving the configuration information including the plurality of RACH configurations and the search space configuration information of the random access response corresponding to each of the RACH configurations transmitted through a broadcast message or dedicated signaling.

In an example, the method may include:

determining a common search space for a common RACH configuration; and excluding a search space for the first RACH configuration from the search space configuration information, to determine that the search space for the first RACH configuration is the common search space.

In an example, the first UE is in one of the following states:

an idle state, an inactive state, or a connected state.

In an example, the first RACH configuration is configured for a first network slice, and the second RACH configuration is configured for a second network slice, the first network slice being different from the second network slice.

In an example, the second RACH configuration is configured for second UE.

In a fifth aspect, an example of the disclosure provides a communication apparatus, including:

a first determination unit configured for determining, for first UE, a first RACH configuration, the first RACH configuration being different from a second RACH configuration;

a second determination unit configured for determining, for the first RACH configuration, first identifier derivation information associated with a random access identifier, the first identifier derivation information being different from second identifier derivation information for the second RACH configuration; and a derivation unit configured for determining, based on the first identifier derivation information, the random access identifier.

In a sixth aspect, an example of the disclosure provides a communication apparatus, including:

a third determination unit configured for determining, for first UE, a first RACH configuration, the first RACH configuration being different from a second RACH configuration;

a fourth determination unit configured for determining, for the first RACH configuration, a first search space for a random access response associated with the first RACH configuration, the first search space being different from a second search space for a random access response associated with the second RACH configuration; and a first communication unit configured for transmitting the random access response for the first RACH configuration in the first search space.

In a seventh aspect, an example of the disclosure provides a communication apparatus, including:

a second communication unit configured for receiving configuration information of a first RACH configuration, the first RACH configuration being different from a second RACH configuration;

a fifth determination unit configured for determining, for the first RACH configuration, first identifier derivation information associated with a random access identifier, the first identifier derivation information being different from second identifier derivation information for the second RACH configuration; and the second communication unit is further configured for determining, based on the first identifier derivation information, the random access identifier.

In an eighth aspect, an example of the disclosure provides a communication apparatus, including:

a third communication unit configured for receiving configuration information of a first random access channel (RACH) configuration, the first RACH configuration being different from a second RACH configuration; and a sixth determination unit configured for receiving, in response to receiving search space configuration information of a first search space for a random access response associated with the first RACH configuration, the random access response for the first RACH configuration in the first search space, the first search space being different from a second search space for a random access response associated with the second RACH configuration.

In a ninth aspect, an example of the disclosure provides a communication apparatus, including:

a processor; and a memory configured for storing an executable instruction executable by the processor; where the processor is configured for implementing the communication method according to any of the foregoing technical solutions applied to network devices when executing the executable instruction.

In a tenth aspect, an example of the disclosure provides a communication apparatus, including:

a processor; and a memory configured for storing an executable instruction executable by the processor; where the processor is configured for implementing the communication method according to any of the foregoing technical solutions applied to UE when executing the executable instruction.

In an eleventh aspect, an example of the disclosure provides a computer storage medium storing an executable instruction, where when executed by a processor, the executable instruction causes the processor to execute the communication method according to any one of the foregoing technical solutions applied to network devices.

In a twelfth aspect, an example of the disclosure provides a computer storage medium storing an executable instruction, where when executed by a processor, the executable instruction causes the processor to execute the communication method according to any one of the foregoing technical solutions applied to UE.

The technical solutions provided in the examples of the disclosure may have the beneficial effects as follows:

determining, for the first UE, the first RACH configuration, the first RACH configuration being different from the second RACH configuration; determining, for the first RACH configuration, the first identifier derivation information associated with the random access identifier, the first identifier derivation information being different from the second identifier derivation information for the second RACH configuration; and determining, based on the first identifier derivation information, the random access identifier. Thus, the UE may distinguish between different random access responses by determining the identifier derivation information associated with the random access identifiers for different RACH configurations.

What is claimed is:

1. A communication method, comprising:

determining a plurality of random access channel (RACH) configurations, the plurality of RACH configurations comprising a first RACH configuration and a second RACH configuration;

determining, by a network device, the first RACH configuration for a first user equipment (UE), the first RACH configuration being different from the second RACH configuration, and the second RACH configuration being configured for a second UE;

determining, by the network device, first identifier derivation information associated with a random access identifier for the first RACH configuration, the first identifier derivation information being different from second identifier derivation information for the second RACH configuration; and determining, based on the first identifier derivation information, the random access identifier;

wherein determining the plurality of RACH configurations comprises determining an order of the plurality of RACH configurations; and wherein determining the first identifier derivation information associated with the random access identifier for the first RACH configuration comprises:

determining the first identifier derivation information associated with the random access identifier according to an order, among the plurality of RACH configurations, of the first RACH configuration and a number of random access channel occasions (ROs) of frequency division multiplexing supported by the first RACH configuration, wherein the first identifier derivation information indicates a start offset of an index value of a frequency domain occasion for the first UE to transmit a random access preamble, or the first identifier derivation information indicates an index value of a frequency domain occasion for the first UE to transmit the random access preamble, and the random access preamble corresponding to the random access identifier;

wherein determining the first identifier derivation information associated with the random access identifier comprises:

determining, in response to determining that the first identifier derivation information indicates the start offset of the index value of a frequency domain occasion for the first UE to transmit the random access preamble, a value of the first identifier derivation information as a start offset of a previous neighboring RACH configuration immediately before the first RACH configuration in the order of the plurality of RACH configurations plus the number of ROs supported by the previous neighboring RACH configuration; and determining, in response to determining that the first RACH configuration is the first one in the order of the plurality of RACH configurations, the value of the first identifier derivation information to be a predetermined start offset;

wherein the method further comprises:

transmitting, in response to determining that the first identifier derivation information indicates the start offset of the index value of the frequency domain occasion for the first UE to transmit the random access preamble, a plurality of pieces of identifier derivation information corresponding to the plurality of RACH configurations, the plurality of pieces of identifier derivation information comprising information indicating the first identifier derivation information.

2. The method according to claim 1, further comprising:

determining, according to the plurality of pieces of identifier derivation information corresponding to the plurality of RACH configurations, the number of ROs of frequency division multiplexing supported by each of the plurality of RACH configurations.

3. The method according to claim 2, wherein determining, for the first RACH configuration, the first identifier derivation information associated with the random access identifier comprises:

determining, according to the first identifier derivation information corresponding to the first RACH configuration and the number of the ROs of frequency division multiplexing supported by the first RACH configuration, the index value of the frequency domain occasion for the first UE to transmit the random access preamble.

4. The method according to claim 1, wherein determining the first identifier derivation information associated with the random access identifier comprises:

determining, in response to determining that the first identifier derivation information indicates the index value of the frequency domain occasion for the first UE to transmit the random access preamble, a plurality of pieces of first identifier derivation information for the first RACH configuration sequentially and incrementally at a fixed step size from an index value of a last RO among a plurality of ROs of the previous neighboring RACH configuration immediately before the first RACH configuration in the order of the plurality of RACH configurations, wherein in response to determining that the first RACH configuration is the first one in the order of the plurality of RACH configurations, the plurality of pieces of first identifier derivation information for the first RACH configuration are determined sequentially and incrementally at the fixed step size from a predetermined fixed value.

5. The method according to claim 1, wherein the first RACH configuration is configured for a first network slice, and the second RACH configuration is configured for a second network slice, the first network slice being different from the second network slice.

6. The method according to claim 1, wherein the plurality of RACH configurations further comprises a common RACH configuration, and the method further comprises:

in response to determining that the first identifier derivation information indicates the start offset of the index value of the frequency domain occasion for the first UE to transmit the random access preamble, determining, in response to determining that the common RACH configuration is ranked first or last among the plurality of RACH configurations, identifier derivation information corresponding to the common RACH configuration as 0.

7. The method according to claim 1, wherein the plurality of RACH configurations further comprises a common RACH configuration, and the method further comprises:

in response to determining that the first identifier derivation information indicates the index value of the frequency domain occasion for the first UE to transmit the random access preamble, determining, in response to determining that the common RACH configuration is ranked first or last among the plurality of RACH configurations, identifier derivation information corresponding to the common RACH configuration as 0 to N1−1, N1 being the number of ROs of frequency division multiplexing supported by the common RACH configuration.

8. The method according to claim 1, further comprising:

not transmitting, for the first UE, the first identifier derivation information, among the plurality of pieces of identifier derivation information, of the first RACH configuration, to indicate that the first identifier derivation information of the first RACH configuration is 0.

9. A communication method, comprising:

receiving configuration information comprising a plurality of random access channel (RACH) configurations, the plurality of RACH configurations comprising a first RACH configuration and a second RACH configuration;

receiving, by a first user equipment (UE), configuration information of the first RACH configuration, the first RACH configuration being different from the second RACH configuration, and the second RACH configuration being configured for a second UE;

determining, by the first UE, first identifier derivation information associated with a random access identifier for the first RACH configuration, the first identifier derivation information being different from second identifier derivation information for the second RACH configuration; and determining, based on the first identifier derivation information, the random access identifier;

wherein determining the first identifier derivation information associated with the random access identifier for the first RACH configuration comprises:

determining the first identifier derivation information associated with the random access identifier according to an order, among the plurality of RACH configurations, of the first RACH configuration and a number of random access channel occasions (ROs) of frequency division multiplexing supported by the first RACH configuration, wherein the first identifier derivation information indicates a start offset of an index value of a frequency domain occasion for the first UE to transmit a random access preamble, or the first identifier derivation information indicates an index value of a frequency domain occasion for the first UE to transmit the random access preamble, and the random access preamble corresponding to the random access identifier;

wherein determining the first identifier derivation information associated with the random access identifier comprises:

determining, in response to determining that the first identifier derivation information indicates the start offset of the index value of a frequency domain occasion for the first UE to transmit the random access preamble, a value of the first identifier derivation information as a start offset of a previous neighboring RACH configuration immediately before the first RACH configuration in the order of the plurality of RACH configurations plus the number of ROs supported by the previous neighboring RACH configuration; and determining, when the first RACH configuration is the first one in the order of the plurality of RACH configurations, the value of the first identifier derivation information to be a predetermined start offset;

wherein the method further comprises:

receiving, in response to determining that the first identifier derivation information indicates the start offset of the index value of the frequency domain occasion for the first UE to transmit the random access preamble, a plurality of pieces of identifier derivation information corresponding to the plurality of RACH configurations, the plurality of pieces of identifier derivation information comprising information indicating the first identifier derivation information.

10. The method according to claim 9, further comprising:

determining, according to the plurality of pieces of identifier derivation information corresponding to the plurality of RACH configurations, the number of ROs of frequency division multiplexing supported by each of the plurality of RACH configurations.

11. The method according to claim 10, wherein determining the first identifier derivation information associated with the random access identifier for the first RACH configuration comprises:

determining, according to the first identifier derivation information corresponding to the first RACH configuration and the number of the ROs of frequency division multiplexing supported by the first RACH configuration, the index value of the frequency domain occasion for the first UE to transmit the random access preamble.

12. The method according to claim 9, wherein determining the first identifier derivation information associated with the random access identifier comprises:

determining, in response to determining that the first identifier derivation information indicates the index value of the frequency domain occasion for the first UE to transmit the random access preamble, a plurality of pieces of first identifier derivation information for the first RACH configuration sequentially and incrementally at a fixed step size from an index value of a last RO among a plurality of ROs of a previous neighboring RACH configuration immediately before the first RACH configuration in the order of the plurality of RACH configurations, wherein when the first RACH configuration is the first one in the order of the plurality of RACH configurations, the plurality of pieces of first identifier derivation information for the first RACH configuration are determined sequentially and incrementally at the fixed step size from a predetermined fixed value.

13. The method according to claim 9, wherein the first RACH configuration is configured for a first network slice, and the second RACH configuration is configured for a second network slice, the first network slice being different from the second network slice.

14. The method according to claim 9, wherein the plurality of RACH configurations further comprises a common RACH configuration, and the method further comprises:

in response to determining that the first identifier derivation information indicates the start offset of the index value of the frequency domain occasion for the first UE to transmit the random access preamble, determining, in response to the common RACH configuration being ranked first or last among the plurality of RACH configurations, identifier derivation information corresponding to the common RACH configuration as 0.

15. The method according to claim 9, wherein the plurality of RACH configurations further comprises a common RACH configuration, and the method further comprises:

in response to determining that the first identifier derivation information indicates the index value of the frequency domain occasion for the first UE to transmit the random access preamble, determining, in response to the common RACH configuration being ranked first or last among the plurality of RACH configurations, identifier derivation information corresponding to the common RACH configuration as 0 to N1−1, N1 being the number of ROs of frequency division multiplexing supported by the common RACH configuration.

16. The method according to claim 9, further comprising:

determining, in response to the plurality of pieces of identifier derivation information excluding the first identifier derivation information of the first RACH configuration, the first identifier derivation information of the first RACH configuration as 0.

17. A communication apparatus, comprising:

a processor; and a memory configured for storing an executable instruction executable by the processor;

wherein the processor is configured for implementing the communication method according to claim 9 when executing the executable instruction.

18. A communication apparatus, comprising:

a processor; and a memory configured for storing an executable instruction executable by the processor;

wherein the processor is configured to:

determine a plurality of random access channel (RACH) configurations, the plurality of RACH configurations comprising a first RACH configuration and a second RACH configuration;

determine the RACH configuration for a first user equipment (UE), the first RACH configuration being different from the second RACH configuration, and the second RACH configuration being configured for a second UE;

determine first identifier derivation information associated with a random access identifier for the first RACH configuration, the first identifier derivation information being different from second identifier derivation information for the second RACH configuration; and determine, based on the first identifier derivation information, the random access identifier;

wherein the processor is further configured to:

determine an order of the plurality of RACH configurations; and determine the first identifier derivation information associated with the random access identifier according to an order, among the plurality of RACH configurations, of the first RACH configuration and a number of random access channel occasions (ROs) of frequency division multiplexing supported by the first RACH configuration, wherein the first identifier derivation information indicates a start offset of an index value of a frequency domain occasion for the first UE to transmit a random access preamble, or the first identifier derivation information indicates an index value of a frequency domain occasion for the first UE to transmit the random access preamble, and the random access preamble corresponding to the random access identifier;

wherein determining the first identifier derivation information associated with the random access identifier comprises:

determining, in response to determining that the first identifier derivation information indicates the start offset of the index value of a frequency domain occasion for the first UE to transmit the random access preamble, a value of the first identifier derivation information as a start offset of a previous neighboring RACH configuration immediately before the first RACH configuration in the order of the plurality of RACH configurations plus the number of ROs supported by the previous neighboring RACH configuration; and determining, in response to determining that the first RACH configuration is the first one in the order of the plurality of RACH configurations, the value of the first identifier derivation information to be a predetermined start offset;

wherein the processor is further configured to:

transmit, in response to determining that the first identifier derivation information indicates the start offset of the index value of the frequency domain occasion for the first UE to transmit the random access preamble, a plurality of pieces of identifier derivation information corresponding to the plurality of RACH configurations, the plurality of pieces of identifier derivation information comprising information indicating the first identifier derivation information.

\* \* \* \* \*